United States Patent
Utsunomiya et al.

(10) Patent No.: US 11,769,023 B2
(45) Date of Patent: Sep. 26, 2023

(54) IMAGE PROCESSING APPARATUS, RECORDING APPARATUS, IMAGE PROCESSING METHOD, AND NON-TRANSITORY COMPUTER-READABLE STORAGE MEDIUM STORING PROGRAM

(71) Applicant: Seiko Epson Corporation, Tokyo (JP)

(72) Inventors: Kohei Utsunomiya, Matsumoto (JP); Nobuaki Ito, Shiojiri (JP); Satoshi Yamazaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/360,343

(22) Filed: Jun. 28, 2021

(65) Prior Publication Data
US 2021/0406620 A1 Dec. 30, 2021

(30) Foreign Application Priority Data
Jun. 30, 2020 (JP) ................. 2020-113034

(51) Int. Cl.
*H04N 1/405* (2006.01)
*G06K 15/02* (2006.01)
*H04N 1/60* (2006.01)

(52) U.S. Cl.
CPC ......... *G06K 15/021* (2013.01); *H04N 1/4052* (2013.01); *H04N 1/6027* (2013.01)

(58) Field of Classification Search
CPC ... G06K 15/021; H04N 1/4052; H04N 1/6027
See application file for complete search history.

(56) References Cited

U.S. PATENT DOCUMENTS

| | | | | |
|---|---|---|---|---|
| 9,227,424 | B1* | 1/2016 | Mantell | B33Y 10/00 |
| 10,811,246 | B2* | 10/2020 | Harayama | B29C 64/236 |
| 2005/0134921 | A1* | 6/2005 | Mantell | H04N 1/52 |
| | | | | 358/3.03 |
| 2007/0236736 | A1* | 10/2007 | Tai | H04N 1/40087 |
| | | | | 358/1.9 |
| 2012/0106835 | A1* | 5/2012 | Bernal | H04N 1/52 |
| | | | | 382/162 |
| 2015/0256714 | A1* | 9/2015 | Yamazaki | G06K 15/1881 |
| | | | | 358/3.05 |
| 2016/0173724 | A1* | 6/2016 | Kakutani | H04N 1/4051 |
| | | | | 358/3.13 |

(Continued)

FOREIGN PATENT DOCUMENTS

| | | | | |
|---|---|---|---|---|
| JP | H0728995 A | * | 1/1995 | ........ H04N 1/6058 |
| JP | 2020-065100 | | 4/2020 | |

(Continued)

*Primary Examiner* — Ted W Barnes
(74) *Attorney, Agent, or Firm* — WORKMAN NYDEGGER

(57) ABSTRACT

A distribution portion that distributes an error based on quantization of a gradation value corresponding to the one pixel, to a first pixel located in a first direction of the one pixel at a first distribution rate, to a second pixel located in a second direction of the one pixel at a second distribution rate, and to a third pixel located in a third direction of the one pixel at a third distribution rate, the second direction is a direction that intersects the first direction, and the third direction is a direction different from an extension direction of a plane defined by the first direction and the second direction.

16 Claims, 20 Drawing Sheets

| dx | dy | dz | DISTRIBUTION RATE |
|---|---|---|---|
| 1 | 0 | 0 | B(1, 0, 0) (=8/16) |
| 0 | 1 | 0 | B(0, 1, 0) (=5/16) |
| 0 | 0 | 1 | B(0, 0, 1) (=3/16) |

GK

(56) References Cited

U.S. PATENT DOCUMENTS

| | | | |
|---|---|---|---|
| 2017/0220031 A1* | 8/2017 | Morovic, Jr. | B33Y 50/02 |
| 2017/0246812 A1* | 8/2017 | Morovic | G05B 19/4099 |
| 2017/0252979 A1* | 9/2017 | Donovan | H04N 1/4052 |
| 2017/0329878 A1* | 11/2017 | Gondek | G06T 17/005 |
| 2017/0364316 A1* | 12/2017 | Morovic | H04N 1/405 |
| 2017/0365095 A1* | 12/2017 | Morovic | G06T 17/10 |
| 2018/0011475 A1* | 1/2018 | Donovan | B22F 10/85 |
| 2018/0036951 A1* | 2/2018 | Harayama | H01L 21/67051 |
| 2018/0108170 A1* | 4/2018 | Matsubara | G06T 15/08 |
| 2018/0126664 A1* | 5/2018 | Okawa | H04N 1/405 |
| 2018/0133979 A1* | 5/2018 | Okawa | H04N 1/52 |
| 2018/0234582 A1* | 8/2018 | Stanich | H04N 1/00037 |
| 2018/0239567 A1* | 8/2018 | Morovic | G06K 15/1881 |
| 2019/0061264 A1* | 2/2019 | Hsieh | H04N 1/4052 |
| 2019/0248074 A1* | 8/2019 | Nishio | B33Y 50/00 |
| 2019/0351618 A1* | 11/2019 | Mao | B29C 64/386 |
| 2020/0099857 A1* | 3/2020 | Nakajima | H04N 1/4051 |
| 2020/0120234 A1* | 4/2020 | Kakutani | H04N 1/405 |
| 2022/0063296 A1* | 3/2022 | Chen | B41J 3/50 |

FOREIGN PATENT DOCUMENTS

| | | | | |
|---|---|---|---|---|
| JP | 2020065100 A * | 4/2020 | | H04N 1/405 |
| WO | WO-2016057029 A1 * | 4/2016 | | B29C 64/386 |
| WO | WO-2016057031 A1 * | 4/2016 | | B29C 64/386 |
| WO | WO-2016119879 A1 * | 8/2016 | | B29C 64/386 |
| WO | WO-2016119908 A1 * | 8/2016 | | B29C 64/386 |
| WO | WO-2016155829 A1 * | 10/2016 | | B29C 64/386 |
| WO | WO-2016167776 A1 * | 10/2016 | | B33Y 50/00 |
| WO | WO-2016173629 A1 * | 11/2016 | | B29C 67/0007 |
| WO | WO-2016173630 A1 * | 11/2016 | | B33Y 50/00 |
| WO | WO-2018140037 A1 * | 8/2018 | | B29C 64/112 |

* cited by examiner

| dx | dy | dz | DISTRIBUTION RATE |
|---|---|---|---|
| 1 | 0 | 0 | B(1, 0, 0) (=8/16) |
| 0 | 1 | 0 | B(0, 1, 0) (=5/16) |
| 0 | 0 | 1 | B(0, 0, 1) (=3/16) |

GK

GK-Z1

| dx | dy | dz | DISTRIBUTION RATE |
|---|---|---|---|
| 1 | 0 | 0 | B(1, 0, 0) (=10/16) |
| 0 | 1 | 0 | B(0, 1, 0) (=6/16) |

FIG. 13

| dx | dy | dz | DISTRIBUTION RATE |
|---|---|---|---|
| 1 | 0 | 0 | B(1, 0, 0) (=7/16) |
| 0 | 1 | 0 | B(0, 1, 0) (=5/16) |
| 1 | 1 | 0 | B(1, 1, 0) (=1/16) |
| -1 | 1 | 0 | B(-1, 1, 0) (=3/16) |

| dx | dy | dz | DISTRIBUTION RATE |
|---|---|---|---|
| 1 | 0 | 0 | B(1, 0, 0) (=7/48) |
| 2 | 0 | 0 | B(2, 0, 0) (=5/48) |
| -2 | 1 | 0 | B(-2, 1, 0) (=3/48) |
| -1 | 1 | 0 | B(-1, 1, 0) (=5/48) |
| 0 | 1 | 0 | B(0, 1, 0) (=7/48) |
| 1 | 1 | 0 | B(1, 1, 0) (=5/48) |
| 2 | 1 | 0 | B(2, 1, 0) (=3/48) |
| -2 | 2 | 0 | B(-2, 2, 0) (=1/48) |
| -1 | 2 | 0 | B(-1, 2, 0) (=3/48) |
| 0 | 2 | 0 | B(0, 2, 0) (=5/48) |
| 1 | 2 | 0 | B(1, 2, 0) (=3/48) |
| 2 | 2 | 0 | B(2, 2, 0) (=1/48) |

GK-Z3

| dx | dy | dz | DISTRIBUTION RATE |
|---|---|---|---|
| 1 | 0 | 0 | B(1, 0, 0) (=16/48) |
| 0 | 1 | 0 | B(0, 1, 0) (=12/48) |
| 0 | 0 | 1 | B(0, 0, 1) (=10/48) |
| 2 | 0 | 0 | B(2, 0, 0) (=6/48) |
| 0 | 2 | 0 | B(0, 2, 0) (=3/48) |
| 0 | 0 | 2 | B(0, 0, 2) (=1/48) |

| dx | dy | dz | DISTRIBUTION RATE |
|---|---|---|---|
| 1 | 0 | 0 | B(1, 0, 0) (=12/48) |
| 0 | 1 | 0 | B(0, 1, 0) (=8/48) |
| 0 | 0 | 1 | B(0, 0, 1) (=4/48) |
| 2 | 0 | 0 | B(2, 0, 0) (=6/48) |
| 0 | 2 | 0 | B(0, 2, 0) (=4/48) |
| 0 | 0 | 2 | B(0, 0, 2) (=2/48) |
| 1 | 1 | 0 | B(1, 1, 0) (=6/48) |
| 1 | 0 | 1 | B(1, 0, 1) (=4/48) |
| 0 | 1 | 1 | B(0, 1, 1) (=2/48) |

FIG. 22

| dx | dy | dz | DISTRIBUTION RATE | |
|---|---|---|---|---|
| 1 | 0 | 0 | B(1, 0, 0) (=11/48) | ↙ GK-C |
| 1 | 0 | 1 | B(1, 0, 1) (=3/48) | |
| -1 | 1 | 0 | B(-1, 1, 0) (=3/48) | |
| -1 | 1 | 1 | B(-1, 1, 1) (=1/48) | |
| 0 | 0 | 1 | B(0, 0, 1) (=7/48) | |
| 0 | 1 | 0 | B(0, 1, 0) (=9/48) | |
| 0 | 1 | 1 | B(0, 1, 1) (=5/48) | |
| 1 | 1 | 0 | B(1, 1, 0) (=6/48) | |
| 1 | 1 | 1 | B(1, 1, 1) (=3/48) | |

FIG. 23

| dx | dy | dz | DISTRIBUTION RATE | |
|---|---|---|---|---|
| 0 | 0 | 1 | B(0, 0, 1) (=7/48) | ↙ GK-D |
| 0 | 0 | 2 | B(0, 0, 2) (=4/48) | |
| 1 | 0 | 0 | B(1, 0, 0) (=9/48) | |
| 1 | 0 | 1 | B(1, 0, 1) (=2/48) | |
| 2 | 0 | 0 | B(2, 0, 0) (=6/48) | |
| -1 | 1 | 0 | B(-1, 1, 0) (=1/48) | |
| -1 | 1 | 1 | B(-1, 1, 1) (=1/48) | |
| 0 | 1 | 0 | B(0, 1, 0) (=8/48) | |
| 0 | 1 | 1 | B(0, 1, 1) (=2/48) | |
| 1 | 1 | 0 | B(1, 1, 0) (=2/48) | |
| 1 | 1 | 1 | B(1, 1, 1) (=1/48) | |
| 0 | 2 | 0 | B(0, 2, 0) (=5/48) | |

| dx | dy | dz | DISTRIBUTION RATE |
|----|----|----|-------------------|
| 1  | 0  | 0  | B(1, 0, 0) (=10/48) |
| 1  | 1  | 0  | B(1, 1, 0) (=5/48) |
| 0  | 1  | 0  | B(0, 1, 0) (=8/48) |
| -1 | 1  | 0  | B(-1, 1, 0) (=4/48) |
| -1 | -1 | 1  | B(-1, -1, 1) (=1/48) |
| 0  | -1 | 1  | B(0, -1, 1) (=2/48) |
| 1  | -1 | 1  | B(1, -1, 1) (=1/48) |
| -1 | 0  | 1  | B(-1, 0, 1) (=3/48) |
| 0  | 0  | 1  | B(0, 0, 1) (=7/48) |
| 1  | 0  | 1  | B(1, 0, 1) (=3/48) |
| -1 | 1  | 1  | B(-1, 1, 1) (=1/48) |
| 0  | 1  | 1  | B(0, 1, 1) (=2/48) |
| 1  | 1  | 1  | B(1, 1, 1) (=1/48) |

GK-E

IMAGE PROCESSING APPARATUS, RECORDING APPARATUS, IMAGE PROCESSING METHOD, AND NON-TRANSITORY COMPUTER-READABLE STORAGE MEDIUM STORING PROGRAM

The present application is based on, and claims priority from JP Application Serial Number 2020-113034, filed Jun. 30, 2020, the disclosure of which is hereby incorporated by reference herein in its entirety.

BACKGROUND

1. Technical Field

The present disclosure relates to an image processing apparatus, a recording apparatus, an image processing method, and a non-transitory computer-readable storage medium storing a program.

2. Related Art

As described in JP-A-2020-065100, a technique for forming an image in a two-dimensional plane by performing halftone processing using an error diffusion method is known in the related art.

However, in the technique in the related art, there is a problem that an image having a shape other than a two-dimensional plane cannot be formed.

SUMMARY

According to an aspect of the present disclosure, there is provided an image processing apparatus including an acquisition portion that acquires image data indicating a gradation value of an image to be displayed by each of a plurality of pixels in a three-dimensional space when the image is represented in the three-dimensional space; and a generation portion that generates display data by quantizing the gradation value indicated by the image data, in which the generation portion includes a selection portion that selects one pixel from the plurality of pixels, and a distribution portion that distributes an error based on quantization of a gradation value corresponding to the one pixel, to a first pixel located in a first direction of the one pixel at a first distribution rate, to a second pixel located in a second direction of the one pixel at a second distribution rate, and to a third pixel located in a third direction of the one pixel at a third distribution rate, the second direction is a direction that intersects the first direction, and the third direction is a direction different from an extension direction of a plane defined by the first direction and the second direction.

In addition, according to another aspect of the present disclosure, there is provided a recording apparatus that forms an image on an object having a three-dimensional shape, the apparatus including a head unit that ejects a liquid; and a control portion that controls ejection of the liquid from the head unit so that the image is formed on the object by a plurality of dots which are formed by the liquid ejected from the head unit, and of which arrangement is determined by an error diffusion method, in which the control portion controls the ejection of the liquid from the head unit so that a distribution of the plurality of dots on a first plane has a frequency characteristic that a high frequency component higher than a predetermined frequency is larger than a low frequency component lower than the predetermined frequency in a spatial frequency domain, when the object has the first plane, and a distribution of the plurality of dots on a second plane has a frequency characteristic that the high frequency component higher than the predetermined frequency is larger than the low frequency component lower than the predetermined frequency in the spatial frequency domain, when the object has the second plane that is not parallel to the first plane.

In addition, according to still another aspect of the present disclosure, there is provided an image processing method including an acquisition step of acquiring image data indicating a gradation value of an image to be displayed by each of a plurality of pixels in a three-dimensional space when the image is represented in the three-dimensional space; and a generation step of generating display data by quantizing the gradation value indicated by the image data, in which the generation step includes a selection step of selecting one pixel from the plurality of pixels, and a distribution step of distributing an error based on quantization of a gradation value corresponding to the one pixel, to a first pixel located in a first direction of the one pixel at a first distribution rate, to a second pixel located in a second direction of the one pixel at a second distribution rate, and to a third pixel located in a third direction of the one pixel at a third distribution rate, the second direction is a direction that intersects the first direction, and the third direction is a direction different from an extension direction of a plane defined by the first direction and the second direction.

In addition, according to still another aspect of the present disclosure, there is provided a non-transitory computer-readable storage medium storing a program, the program causing a computer to function as an acquisition portion that acquires image data indicating a gradation value of an image to be displayed by each of a plurality of pixels in a three-dimensional space when the image is represented in the three-dimensional space; and a generation portion that generates display data by quantizing the gradation value indicated by the image data, in which the generation portion functions as a selection portion that selects one pixel from the plurality of pixels, and a distribution portion that distributes an error based on quantization of a gradation value corresponding to the one pixel, to a first pixel located in a first direction of the one pixel at a first distribution rate, to a second pixel located in a second direction of the one pixel at a second distribution rate, and to a third pixel located in a third direction of the one pixel at a third distribution rate, the second direction is a direction that intersects the first direction, and the third direction is a direction different from an extension direction of a plane defined by the first direction and the second direction.

BRIEF DESCRIPTION OF THE DRAWINGS

FIG. 13 is an explanatory table illustrating an example of error diffusion data according to the reference example.

FIG. 14 is an explanatory table illustrating an example of error diffusion data according to the reference example.

FIG. 22 is an explanatory table illustrating an example of error diffusion data according to Modification Example 1.

FIG. 23 is an explanatory table illustrating an example of error diffusion data according to Modification Example 1.

DESCRIPTION OF EXEMPLARY EMBODIMENTS

Hereinafter, an embodiment for performing the present disclosure will be described with reference to the drawings. However, in each drawing, a dimension and scale of each part are appropriately different from those of the actual ones. In addition, since the embodiment described below is suitable specific examples of the present disclosure, various technically preferable limitations are added, and the scope of the present disclosure is not limited to these embodiments unless otherwise stated in the following description to particularly limit the present disclosure.

A. Embodiment

A recording system Sys according to the present embodiment will be described.

In the present embodiment, the recording system Sys is a system for forming an image G on the surface SF of an object Obj having a three-dimensional shape. The recording system Sys may be able to form an image G on an object Obj having a two-dimensional shape.

1. Overview of Recording System Sys

In the following, first, an outline example of a configuration of the recording system Sys according to the present embodiment will be described with reference to FIGS. 1 to 3.

Figure 1:
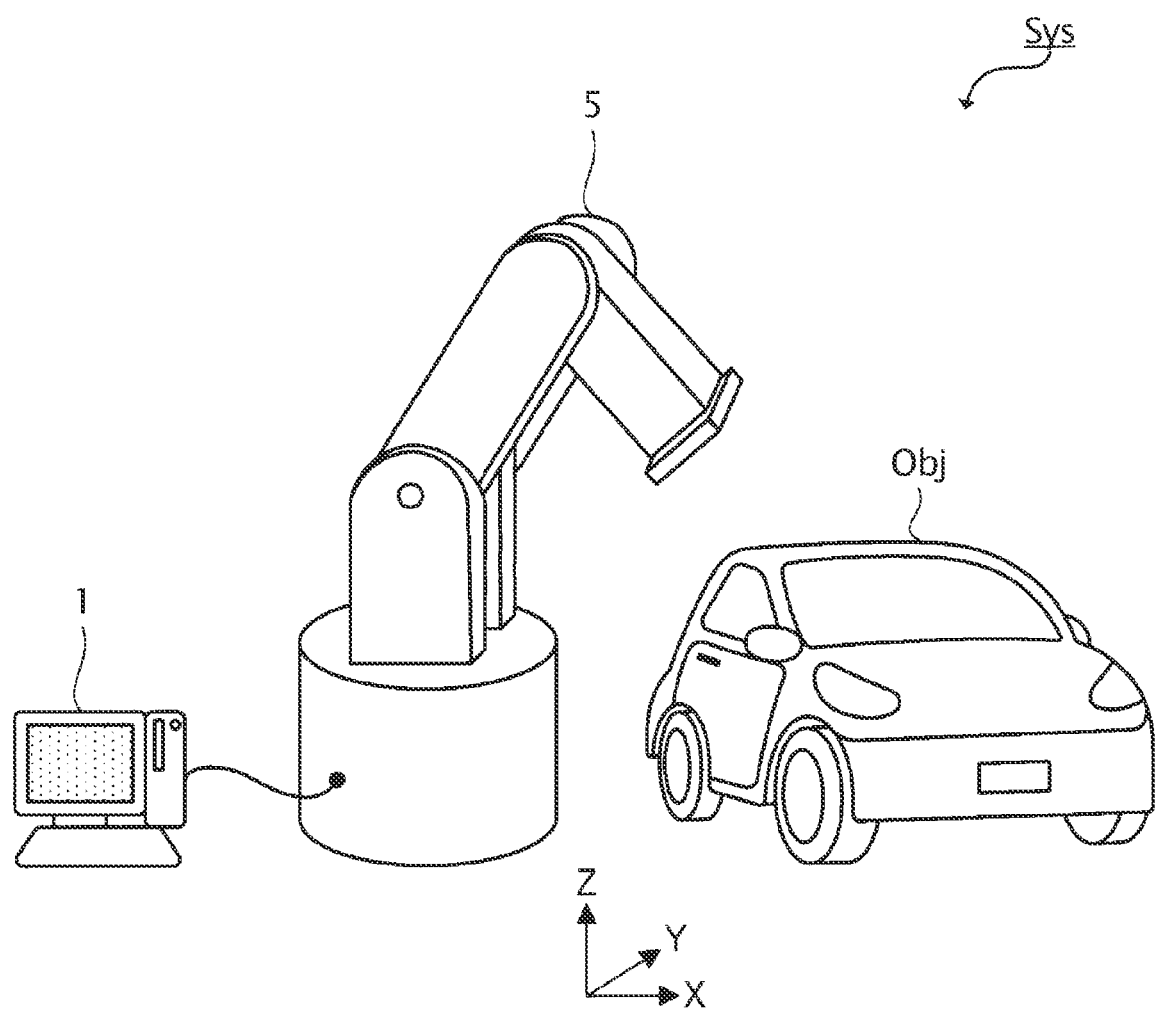
FIG. 1 is an explanatory diagram illustrating an example of a recording system according to an embodiment of the present disclosure.

FIG. 1 is an explanatory diagram illustrating an example of the recording system Sys.

As illustrated in FIG. 1, the recording system Sys is provided with a terminal apparatus 1 and a recording apparatus 5.

Of these, the terminal apparatus 1 generates display data Img indicating an image G formed on a surface SF of the object Obj by the recording system Sys.

In addition, the recording apparatus 5 forms the image G indicated by the display data Img with respect to the surface SF of the object Obj based on the display data Img generated by the terminal apparatus 1.

As illustrated in FIG. 1, the terminal apparatus 1 sets a three-dimensional coordinate system having an X axis, a Y axis, and a Z axis in the image formation space SP, which is a three-dimensional space in which the object Obj exists. In the following, one direction along the X axis is referred to as a +X direction, a direction opposite to the +X direction is referred to as a −X direction, one direction along the Y axis is referred to as a +Y direction, a direction opposite to the +Y direction is referred to as a −Y direction, one direction along the Z axis is referred to as a +Z direction, and a direction opposite to the +Z direction is referred to as a −Z direction. In addition, in the following, the +X direction and the −X direction may be collectively referred to as an X axis direction, the +Y direction and the −Y direction may be collectively referred to as a Y axis direction, and the +Z direction and the −Z direction may be collectively referred to as a Z axis direction. In the present embodiment, although it is assumed that the terminal apparatus 1 sets the X axis, the Y axis, and the Z axis so as to be orthogonal to each other, the present disclosure is not limited to such an aspect, and the X axis, Y axis, and Z axis may be defined to intersect each other.

Figure 2:
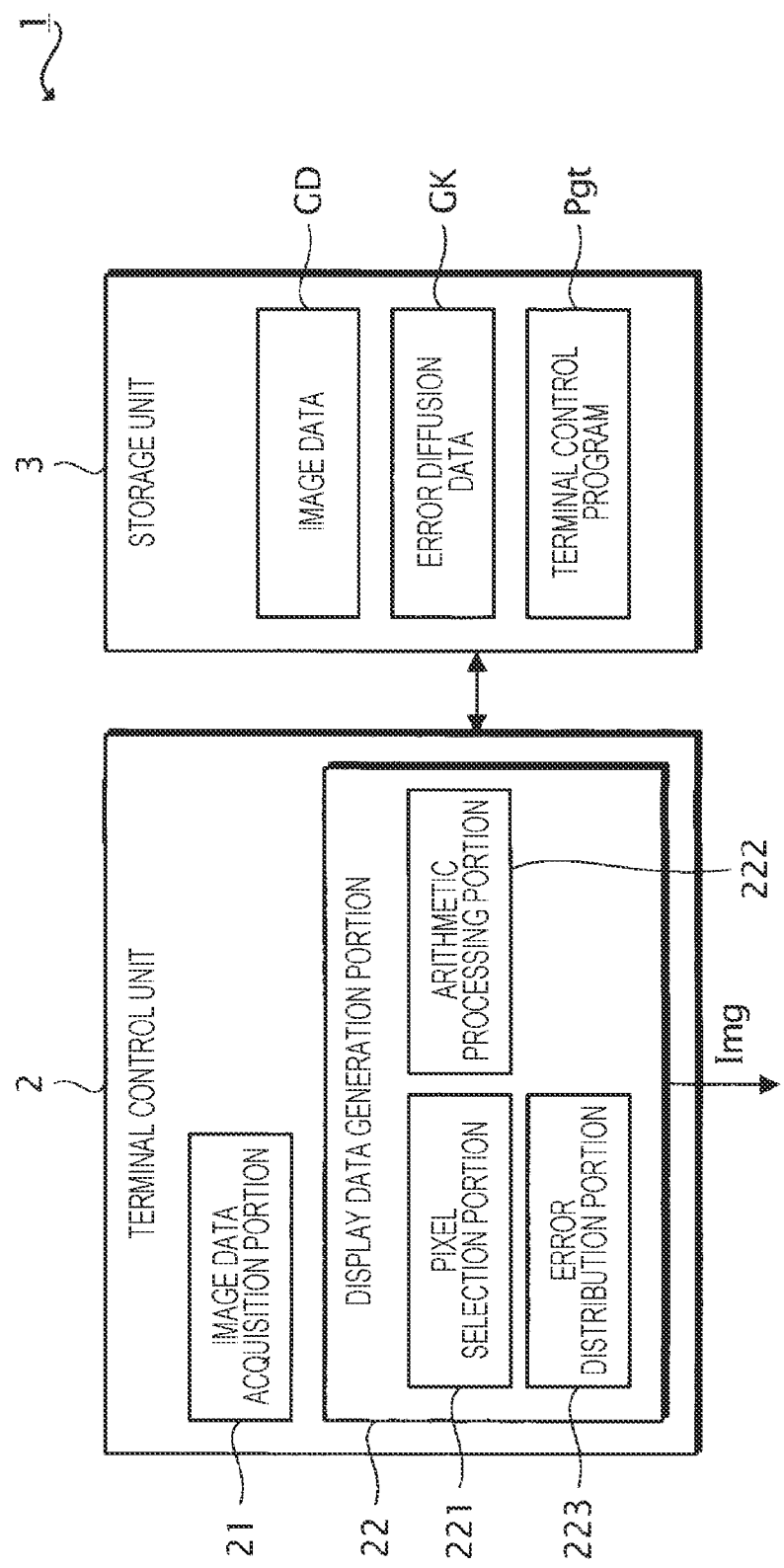
FIG. 2 is a functional block diagram illustrating an example of a configuration of a terminal apparatus.

FIG. 2 is a functional block diagram illustrating an example of the configuration of the terminal apparatus 1.

As illustrated in FIG. 2, the terminal apparatus 1 is provided with a terminal control unit 2 and a storage unit 3.

The storage unit 3 stores image data GD, error diffusion data GK, and a control program Pgt of the terminal apparatus 1.

Of these, the image data GD indicates, for example, an image Gf that a user of the recording system Sys intends to form on the surface SF of the object Obj using the recording system Sys. Specifically, the image data GD indicates a gradation value of the image Gf corresponding to each of the plurality of pixels Px constituting the image formation space SP. Although the details will be described later, the recording system Sys may not be able to express the gradation value of the image Gf indicated by the image data GD. Therefore, the recording system Sys forms the image G in which the image Gf is expressed by a gradation value that can be expressed by the recording system Sys. Specifically, the recording system Sys generates display data Img based on the image data GD using the error diffusion data GK stored in the storage unit 3, and forms the image G indicated by the generated display data Img on the surface SF of the object Obj.

The error diffusion data GK will be described later.

As illustrated in FIG. 2, the terminal control unit 2 is configured to include one or a plurality of CPUs and controls each part of the terminal apparatus 1. Here, CPU is an abbreviation for a central processing unit. One or the plurality of CPUs provided in the terminal control unit 2 can function as an image data acquisition portion 21 and a display data generation portion 22 by executing the control program Pgt stored in the storage unit 3 and operating according to the control program Pgt.

Of these, the image data acquisition portion 21 acquires the image data GD stored in the storage unit 3. In the present embodiment, although a case where the image data GD is stored in the storage unit 3 is assumed as an example, the present disclosure is not limited to such an aspect. For example, the image data GD may be stored in an external device existing outside the terminal apparatus 1. In this case, the image data acquisition portion 21 may acquire the image data GD from the external device.

In addition, the display data generation portion 22 generates the display data Img by executing quantization processing which is processing of quantizing the gradation value of the pixel Px indicated by the image data GD. Specifically, in the present embodiment, as the quantization processing, the display data generation portion 22 performs so-called error diffusion processing in which the gradation value is sequentially changed for each pixel Px while reflecting the error when changing the gradation value of the image Gf corresponding to one pixel Px in the gradation value of the image Gf corresponding to another pixels Px.

In the present embodiment, the display data generation portion 22 is provided with a pixel selection portion 221, an arithmetic processing portion 222, and an error distribution portion 223. Of these, the pixel selection portion 221 selects a target pixel PxT that is the pixel Px to be a target of the error diffusion processing. In addition, the arithmetic processing portion 222 determines the gradation value of the image G corresponding to the target pixel PxT by performing the error diffusion processing on the gradation value of the image Gf corresponding to the target pixel PxT. In addition, the error distribution portion 223 distributes the error E between the gradation value of the image Gf corresponding to the target pixel PxT and the gradation value of the image G corresponding to the target pixel PxT with respect to the gradation value of the image Gf corresponding to a peripheral pixel PxS located around the target pixel PxT by using the error diffusion data GK.

Figure 3:
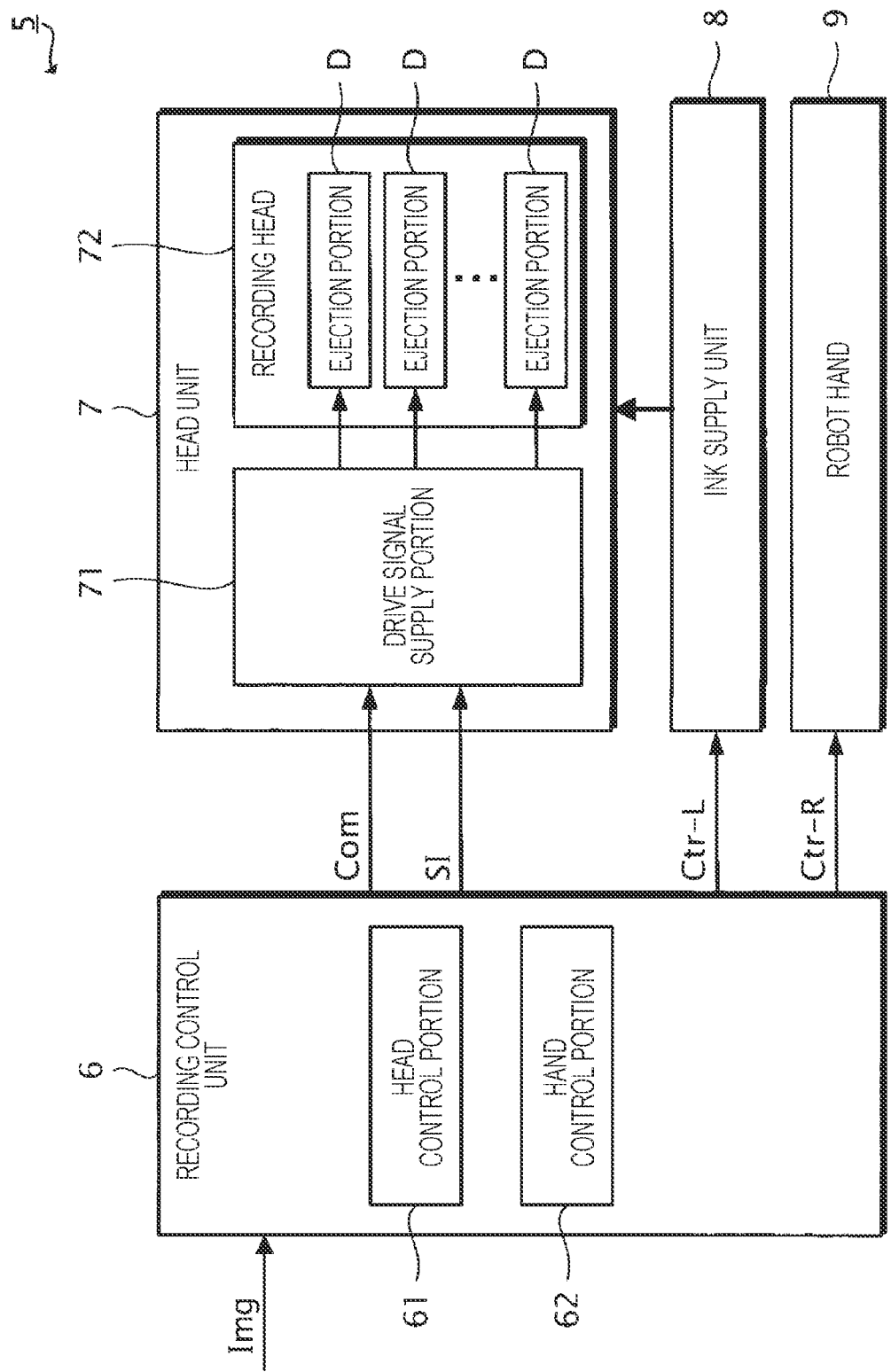
FIG. 3 is a functional block diagram illustrating an example of a configuration of a recording apparatus.

FIG. 3 is a functional block diagram illustrating an example of a configuration of the recording apparatus 5.

As illustrated in FIG. 3, the recording apparatus 5 is provided with a recording control unit 6, a head unit 7, an ink supply unit 8, and a robot hand 9.

The recording control unit 6 includes a processing circuit such as a CPU or FPGA and a storage circuit such as a semiconductor memory, and controls each element of the recording apparatus 5. Here, FPGA is an abbreviation for a field programmable gate array. The processing circuit provided in the recording control unit 6 can function as a head control portion 61 and a hand control portion 62.

Of these, the head control portion 61 generates a drive control signal SI for controlling the drive of the head unit 7 based on the display data Img. In addition, the head control portion 61 generates a drive signal Com for driving the head unit 7 and a control signal Ctr-L for controlling the ink supply unit 8.

In addition, the hand control portion 62 generates a control signal Ctr-R for controlling the position and posture of the robot hand 9 in the image formation space SP based on the display data Img.

The head unit 7 is provided with a drive signal supply portion 71 and a recording head 72.

Of these, the recording head 72 is provided with a plurality of ejection portions D. Each ejection portion D is driven by the drive signal Com to eject the ink filled inside the ejection portion D and form dots on the surface SF of the object Obj.

In addition, the drive signal supply portion 71 switches whether or not to supply the drive signal Com to each of the plurality of ejection portions D based on the drive control signal SI.

In the present embodiment, it is assumed that the head unit 7 is attached to the tip end of the robot hand 9 as an example.

The ink supply unit 8 supplies the ink stored inside the ink supply unit 8 to the head unit 7 based on the control signal Ctr-L.

The robot hand 9 changes the position and posture of the tip end of the robot hand 9 in the image formation space SP based on the control signal Ctr-R. As a result, the robot hand 9 changes the position and posture of the head unit 7 in the image formation space SP, so that the head unit 7 attached to the tip end of the robot hand 9 is in a position and posture suitable for forming the image G with respect to the surface SF of the object Obj.

As described above, when the display data Img is supplied, the recording control unit 6 controls the ejection of ink from the plurality of ejection portions D provided in the head unit 7 by the drive control signal SI generated based on the display data Tmg. In addition, the recording control unit 6 controls the position and posture of the head unit 7 attached to the tip end of the robot hand 9 in the image formation space SP by the control signal Ctr-R generated based on the display data Img. Therefore, the recording apparatus 5 can form the image G corresponding to the display data Img on the surface SF of the object Obj disposed in the image formation space SP. In the following, processing in which the recording apparatus 5 forms the image G corresponding to the display data Img on the surface SF of the object Obj may be referred to as printing processing.

2. Image Formation Space and Image Data

In the following, the image formation space SP and the image data GD will be described with reference to FIGS. 4 and 5.

Figure 4:
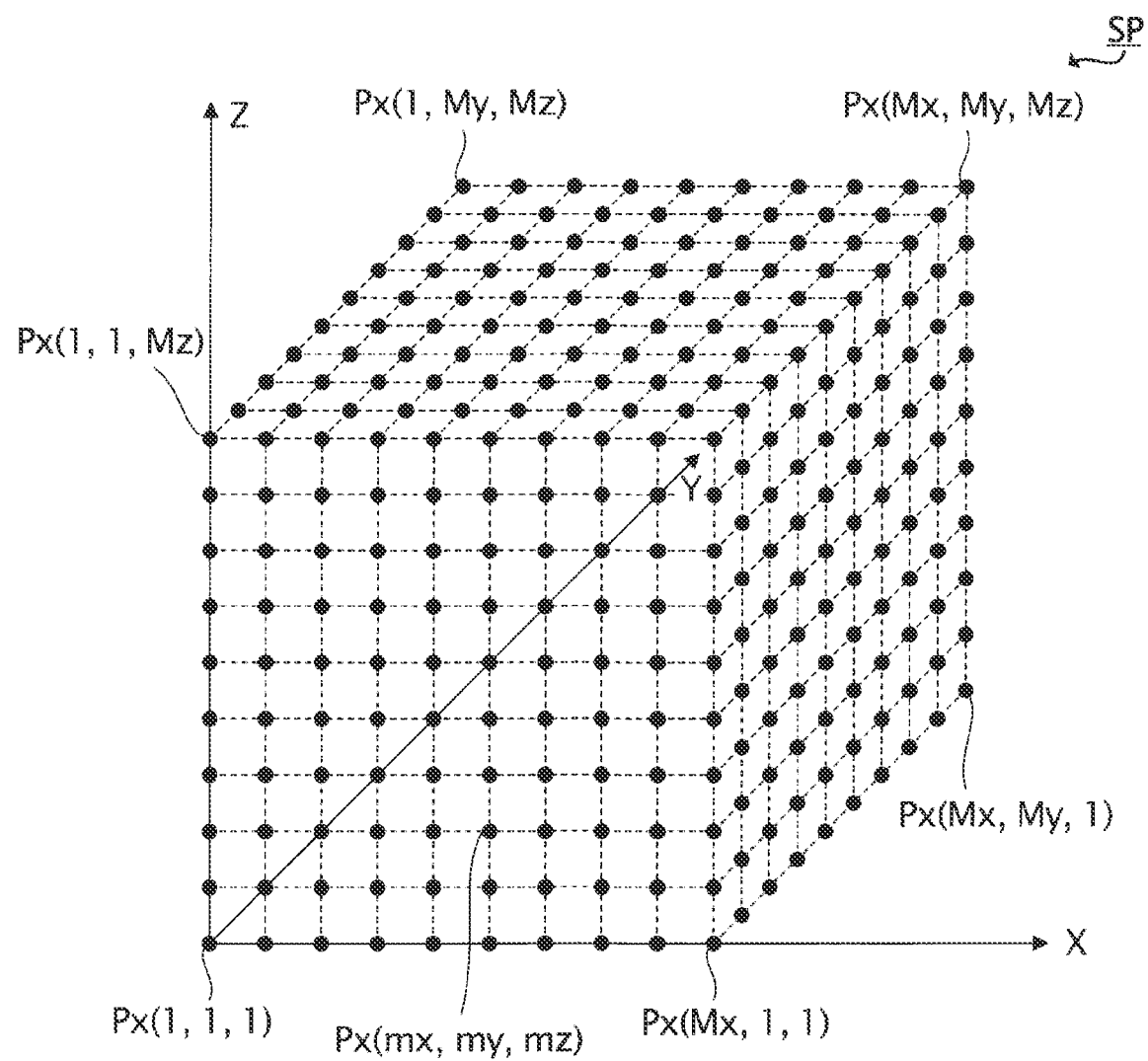
FIG. 4 is an explanatory diagram illustrating an example of an image formation space.

FIG. 4 is an explanatory diagram illustrating an example of a plurality of pixels Px arranged in the image formation space SP.

As illustrated in FIG. 4, in the image formation space SP according to the present embodiment, a total of Mx×My×Mz pixels Px are arranged so that Mx pixels Px extend in the X axis direction, My pixels Px extend in the Y axis direction, and Mz pixels Px extend in the Z axis direction. Here, the value Mx, the value My, and the value Mz are natural numbers of 2 or more. The value Mx, the value My, and the value Mz are preferably natural numbers of 128 or more. In the present embodiment, as an example, it is assumed that the value Mx, the value My, and the value Mz are natural numbers of 256 or more. In addition, in the following, a natural number M such that "M=Mx×My×Mz" is defined. That is, in the present embodiment, M pixels Px are arranged in the image formation space SP.

In addition, in the following, a natural number variable mx satisfying 1≤mx≤Mx is introduced, a natural number variable my satisfying 1≤my≤My is introduced, and a natural number variable mz satisfying 1≤mz≤Mz is introduced. As illustrated in FIG. 4, among the M pixels Px existing in the image formation space SP, the pixel Px located at the mx-th position counting from the −X side to the +X side in the X axis direction, located at the my-th position counting from the −Y side to the +Y side in the Y axis direction, and located at the mz-th position counting from the −Z side to the +Z side in the Z axis direction may be referred to as a pixel Px (mx, my, mz).

In addition, in the following, the position of the pixel Px (mx, my, mz) in the image formation space SP in the X axis direction is referred to as "X [mx]", the position of the pixel Px (mx, my, mz) in the image formation space SP in the Y axis direction is referred to as "Y [my]", and the position of the pixel Px (mx, my, mz) in the image formation space SP in the Z axis direction is referred to as "Z [mz]". That is, the position of the pixel Px (mx, my, mz) in the image formation space SP is expressed as (X, Y, Z)=(X [mx], Y [my], Z [mz]).

In the following, a plurality of pixels Px located at Y=Y [my] and Z=Z [mz] are referred to as a pixel row PxL [my] [mz]. The pixel row PxL [my] [mz] includes Mx pixels Px extending in the X axis direction. The M pixels Px existing in the image formation space SP include (My×Mz) pixel rows PxL [my] [mz].

In addition, in the following, the plurality of pixels Px located at Z=Z [mz] are referred to as a pixel plane PxP [mz]. The pixel plane PxP [mz] includes (Mx×My) pixels Px existing on a plane parallel to the XY plane. The M pixels Px existing in the image formation space SP include Mz pixel planes PxP [mz].

Figure 5:
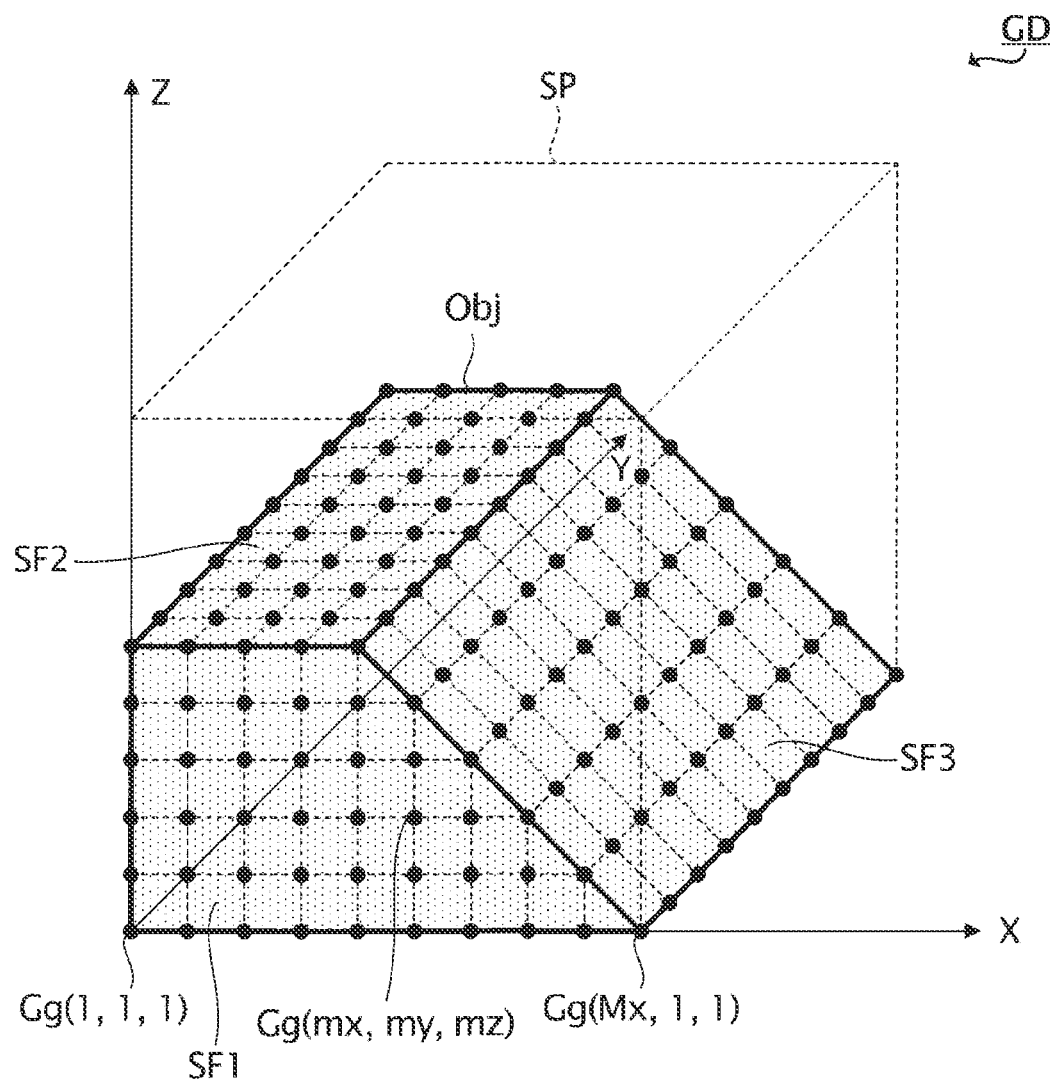
FIG. 5 is an explanatory diagram illustrating an example of image data.

FIG. 5 is an explanatory diagram for describing an example of the image data GD. In FIG. 5, as an example, it is assumed that the surface SF of the object Obj includes a plane SF1, a plane SF2, and a plane SF3.

As described above, the image data GD is data indicating the image Gf. Specifically, the image data GD indicates a gradation value to be displayed by each of the M pixels Px existing in the image formation space SP in order to display the image Gf in the image formation space SP. In the following, as illustrated in FIG. 5, the gradation value of the image Gf in the pixel Px (mx, my, mz) illustrated by the image data GD is referred to as a gradation value Gg (mx, my, mz). In the following, the gradation value of the image Gf in the pixel Px indicated by the image data GD may be simply referred to as the gradation value Gg.

In the present embodiment, it is assumed that the gradation value Gg (mx, my, mz) is a natural number between a minimum gradation value Gg-min and a maximum gradation value Gg-max. Specifically, in the present embodiment, for example, it is assumed that the gradation value Gg-min is "0" and the gradation value Gg-max is "255". In the present embodiment, it is assumed that the gradation value Gg (mx, my, mz) is any value of 256 values from "0" to "255".

In addition, in the present embodiment, in the image formation space SP, it is assumed that the gradation value Gg (mx, my, mz) is set to the gradation value Gg-min for the pixel Px (mx, my, mz) in which the surface SF of the object Obj does not exist. In the present embodiment, when the gradation value Gg (mx, my, mz) is the gradation value Gg-min, it is assumed that the pixel Px (mx, my, mz) is a pixel Px that does not display anything.

As described above, the terminal control unit 2 generates the display data Img based on the image data GD. The display data Img indicates a gradation value to be displayed by each of the M pixels Px existing in the image formation space SP in order to form the image G on the surface SF of the object Obj existing in the image formation space SP.

In the following, the gradation value of the image G in the pixel Px (mx, my, mz) indicated by the display data Img is referred to as a gradation value GI (mx, my, mz). In the present embodiment, it is assumed that the gradation value GI (mx, my, mz) indicates one of two values of the maximum gradation value GI-1 and the minimum gradation value GI-0. In the present embodiment, as an example, it is assumed that the maximum gradation value GI-1 is the same value "255" as the gradation value Gg-max, and the minimum gradation value GI-0 is the same value "0" as the gradation value Gg-min.

In addition, in the present embodiment, a dot is formed on the pixel Px (mx, my, mz) in which the gradation value GI (mx, my, mz) is the maximum gradation value GI-1 by the ink ejected from the recording apparatus 5. On the other hand, in the present embodiment, a dot is not formed on the pixel Px (mx, my, mz) in which the gradation value GI (mx, my, mz) is the minimum gradation value GI-0. In the following, the pixel Px in which the maximum gradation value Gg-1 is displayed and the dot is formed is referred to as a dot formation pixel Px-1. In addition, the pixel Px in which the minimum gradation value Gg-0 is displayed and the dot is not formed is referred to as a dot non-forming pixel Px-0.

3. Operation of Recording System

In the following, an example of the operation of the recording system Sys according to the present embodiment will be described with reference to FIGS. 6 and 7. In the present embodiment, processing of Steps S10 to S23 in FIG. 6 correspond to error diffusion processing (quantization processing) for M pixels Px.

Figure 6:
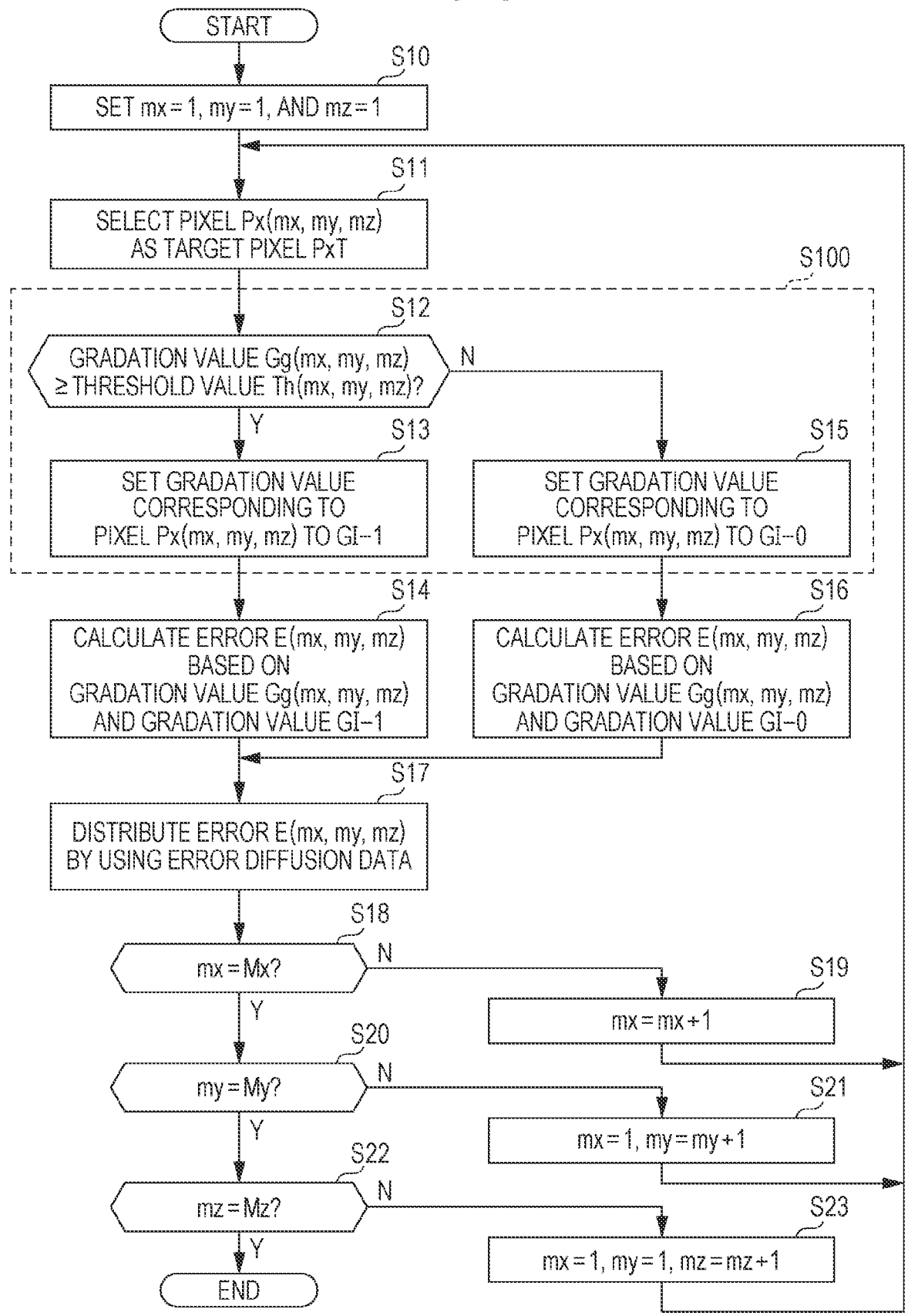
FIG. 6 is a flowchart illustrating an example of display data generation processing.

FIG. 6 is a flowchart illustrating an example of the operation of the recording system Sys when the recording system Sys executes the display data generation processing. Here, the display data generation processing is processing of generating the display data Img based on the image data GD. In other words, the display data generation processing is error diffusion processing for M pixels Px.

As illustrated in FIG. 6, when the display data generation processing is started, the pixel selection portion 221 sets the variable mx to "1", the variable my to "1", and the variable mz to "1" (S10).

Next, the pixel selection portion 221 selects the pixel Px (mx, my, mz) as the target pixel PxT (S11).

Thereafter, the arithmetic processing portion 222 determines whether or not the gradation value of the image Gf in the target pixel PxT indicated by the image data GD, that is, the gradation value Gg (mx, my, mz) is equal to or greater than the threshold value Th (mx, my, mz) (S12). Here, the threshold value Th (mx, my, mz) is a value that satisfies the following equation (1).

$$(1-\gamma 1) \times Gg\text{-min} + \gamma 1 \times Gg\text{-max} \leq Th(mx, my, mz) \leq (1-\gamma 2) \times Gg\text{-min} + \gamma 2 \times Gg\text{-max} \quad \text{Equation (1)}$$

In the present embodiment, the value γ1 is, for example, a real number satisfying "0.3≤γ1≤0.5", and the value γ2 is, for example, a real number satisfying "0.5≤γ2≤0.7". Furthermore, it is preferable that the threshold value Th (mx, my, mz) is equal in all of the M pixels Px. Therefore, in the present embodiment, it is assumed that the threshold value Th (mx, my, mz) is "128" in all of the M pixels Px.

Next, when the determination result in Step S12 is affirmative, the arithmetic processing portion 222 sets the gradation value GI (mx, my, mz) corresponding to the pixel Px (mx, my, mz) which is the target pixel PxT to the maximum gradation value GI-1 (S13).

The error distribution portion 223 calculates the error E corresponding to the pixel Px (mx, my, mz) based on the gradation value Gg (mx, my, mz) and the gradation value GI (mx, my, mz) set in Step S13 (S14). In the present embodiment, as an example, the error distribution portion 223 calculates a value based on the value obtained by subtracting the gradation value Gg (mx, my, mz) from the gradation value GI (mx, my, mz) as the error E corresponding to the pixel Px (mx, my, mz) in Step S14. More specifically, in Step S14, the error distribution portion 223 calculates a value obtained by adding "1" to the maximum gradation value GI-1 and further subtracting the gradation value Gg (mx, my, mz) as an error E corresponding to the pixel Px (mx, my, mz). For example, in Step S14, the error distribution portion 223 may calculate the value obtained by subtracting the gradation value Gg (mx, my, mz) from the maximum gradation value GI-1 as the error E corresponding to the pixel Px (mx, my, mz). In the following, the error E corresponding to the pixel Px (mx, my, mz) may be referred to as an error E (mx, my, mz).

In the present embodiment, in Step S14, the error distribution portion 223 calculates the error E (mx, my, mz) as a value obtained by subtracting the gradation value Gg (mx, my, mz) from the gradation value GI (mx, my, mz). Such an aspect is an example, and the present disclosure is not limited to such an aspect. For example, the error distribution portion 223 may calculate the error E (mx, my, mz) as a value obtained by subtracting the gradation value Gg (mx, my, mz) from a constant such as the gradation value Gg-max. In this case, the maximum gradation value GI-1 may be set to "1" and the minimum gradation value GI-0 may be set to "0".

In the present embodiment, the error E (mx, my, mz) calculated in Step S14 satisfies "E (mx, my, mz)≥0".

On the other hand, when the result of the determination in Step S12 is negative, the arithmetic processing portion 222 sets the gradation value GI (mx, my, mz) corresponding to the pixel Px (mx, my, mz) which is the target pixel PxT to the minimum gradation value GI-0 (S15).

The error distribution portion 223 calculates the error E (mx, my, mz) based on the gradation value Gg (mx, my, mz) and the gradation value GI (mx, my, mz) set in Step S15 (S16). Specifically, in Step S16, the error distribution portion 223 calculates the value obtained by subtracting the gradation value Gg (mx, my, mz) from the gradation value GI (mx, my, mz) as the error E (mx, my, mz). More specifically, in Step S16, the error distribution portion 223 calculates the value obtained by subtracting the gradation value Gg (mx, my, mz) from the minimum gradation value GI-0 as the error E (mx, my, mz).

In the present embodiment, in Step S16, the error distribution portion 223 calculates the error E (mx, my, mz) as a value obtained by subtracting the gradation value Gg (mx, my, mz) from the gradation value GI (mx, my, mz). Such an aspect is an example, and the present disclosure is not limited to such an aspect. For example, the error distribution portion 223 may calculate the error E (mx, my, mz) as a value obtained by subtracting the gradation value Gg (mx, my, mz) from a constant such as the gradation value Gg-min. Also in this case, the maximum gradation value GI-1 may be set to "1" and the minimum gradation value GI-0 may be set to "0".

In the present embodiment, the error E (mx, my, mz) calculated in Step S16 satisfies "E (mx, my, mz)≤0".

In the present embodiment, as illustrated as Step S100 in FIG. 6, the processing of Steps S12, S13, and S15 executed by the arithmetic processing portion 222 correspond to the error diffusion processing for one pixel Px (quantization processing for one pixel Px).

Thereafter, the error distribution portion 223 executes the error distribution processing, which is processing of distributing the error E (mx, my, mz) to one or a plurality of gradation values Gg corresponding to one or a plurality of peripheral pixels PxS located around the target pixel PxT by using the error diffusion data GK (S17). In the following, when the target pixel PxT is the pixel Px (mx, my, mz), the peripheral pixel PxS may be expressed as the pixel Px (mx+dx, my+dy, mz+dz). Here, the value dx, the value dy, and the value dz are integers.

Specifically, in the error distribution processing in Step S17, when the pixel Px (mx+dx, my+dy, mz+dz) which is the peripheral pixel PxS exists, the error distribution portion 223 changes the gradation value Gg (mx+dx, my+dy, mz+dz) corresponding to the pixel Px (mx+dx, my+dy, mz+dz) based on the following equations (2) and (3).

$$Gg(mx+dx,my+dy,mz+dz)=Gg(mx+dx,my+dy,mz+dz)- \\ EB(dx,dy,dz) \quad \text{Equation (2)}$$

$$EB(dx,dy,dz)=\{E(mx,my,mz)\times B(dx,dy,dz)\} \quad \text{Equation (3)}$$

That is, in the error distribution processing in Step S17, the error distribution portion 223 changes the gradation value Gg (mx+dx, my+dy, mz+dz) indicated by the image data GD by subtracting the distribution value EB (dx, dy, dz), which is a value obtained by multiplying the error E (mx, my, mz) and the distribution rate B (dx, dy, dz), from the gradation value Gg (mx+dx, my+dy, mz+dz). In the present embodiment, as an example, when the right side of the equation (3) includes a value after the decimal point, the right side of the equation (3) is rounded, rounded up, or rounded down so that the distribution value EB (dx, dy, dz) is an integer value.

Here, the distribution rate B (dx, dy, dz) is a real number satisfying "0<B (dx, dy, dz)<1". In the present embodiment, one or a plurality of peripheral pixels PxS corresponding to the target pixel PxT and the distribution rate B corresponding to each peripheral pixel PxS are determined by the error diffusion data GK.

Figure 7:
FIG. 7 is an explanatory table illustrating an example of error diffusion data.

FIG. 7 is an explanatory table for describing the error diffusion data GK according to the present embodiment.

As illustrated in FIG. 7, the error diffusion data GK is data that determines the peripheral pixel PxS and the distribution rate B corresponding to the peripheral pixel PxS. Specifically, when the pixel Px (mx, my, mz) is the target pixel PxT, the error diffusion data GK is data in which the values dx, the value dy, and the value dz for specifying the pixel Px (mx+dx, my+dy, mz+dz), which is the peripheral pixel PxS, and the distribution rate B (dx, dy, dz) corresponding to the pixel Px (mx+dx, my+dy, mz+dz) are associated with each other.

In the present embodiment, when the target pixel PxT is the pixel Px (mx, my, mz), as an example, it is assumed that the pixel Px (mx+1, my, mz), the pixel Px (mx, my+1, mz), and the pixel Px (mx, my, mz+1) correspond to the peripheral pixel PxS.

In addition, in the present embodiment, it is assumed that the relationships illustrated in the following equations (4) to (6) are established between the distribution rate B (1, 0, 0) corresponding to the pixel Px (mx+1, my, mz), the distribution rate B (0, 1, 0) corresponding to the pixel Px (mx, my+1, mz), and the distribution rate B (0, 0, 1) corresponding to the pixel Px (mx, my, mz+1).

$$B(1,0,0) > B(0,1,0) \qquad \text{Equation (4)}$$

$$B(0,1,0) > B(0,0,1) \qquad \text{Equation (5)}$$

$$B(1,0,0) + B(0,1,0) + B(0,0,1) = 1 \qquad \text{Equation (6)}$$

That is, in the present embodiment, it is assumed that the distribution rate B (1, 0, 0) is larger than the distribution rate B (0, 1, 0), and the distribution rate B (0, 1, 0) is larger than the distribution rate B (0, 0, 1). In addition, in the present embodiment, it is assumed that the sum of the distribution rate B (1, 0, 0), the distribution rate B (0, 1, 0), and the distribution rate B (0, 0, 1) is "1".

More specifically, in the present embodiment, as an example, it is assumed that the distribution rate B (1, 0, 0) is "8/16", the distribution rate B (0, 1, 0) is "5/16", and the distribution rate B (0, 0, 1) is "3/16". That is, in the present embodiment, in the error distribution processing in Step S17, the error distribution portion 223 updates the gradation value Gg (mx+1, my, mz) by subtracting the distribution value EB (1, 0, 0), which is a value obtained by multiplying the error E (mx, my, mz) by "8/16", from the gradation value Gg (mx+1, my, mz), updates the gradation value Gg (mx, my+1, mz) by subtracting the distribution value EB (0, 1, 0), which is a value obtained by multiplying the error E (mx, my, mz) by "5/16", from the gradation value Gg (mx, my+1, mz), and updates the gradation value Gg (mx, my, mz+1) by subtracting the distribution value EB (0, 0, 1), which is a value obtained by multiplying the error E (mx, my, mz) by "3/16", from the gradation value Gg (mx, my, mz+1).

The description is returned to FIG. 6.

As illustrated in FIG. 6, the pixel selection portion 221 determines whether or not the value mx corresponding to the pixel Px (mx, my, mz) satisfies "mx=Mx" (S18). In other words, in Step S18, the pixel selection portion 221 determines whether or not the pixel Px (mx+1, my, mz) does not exist in the M pixels Px constituting the image formation space SP.

When the result of the determination in Step S18 is negative, that is, the value mx satisfies "mx<Mx", the pixel selection portion 221 adds "1" to the value mx (S19) and proceeds to the processing in Step S11.

On the other hand, when the result of the determination in Step S18 is affirmative, that is, the value mx satisfies "mx=Mx", and the pixel Px (mx+1, my, mz) does not exist in the M pixels Px constituting the image formation space SP, the pixel selection portion 221 determines whether or not the value my corresponding to the pixel Px (mx, my, mz) satisfies "my=My" (S20). In other words, in Step S20, the pixel selection portion 221 determines whether or not the pixel Px (mx, my+1, mz) does not exist in the M pixels Px constituting the image formation space SP.

When the result of the determination in Step S20 is negative, that is, the value my satisfies "my<My", the pixel selection portion 221 sets the value mx to "1", adds "1" to the value my (S21), and proceeds to the processing in Step S11.

On the other hand, when the result of the determination in Step S20 is affirmative, that is, the value my satisfies "my=My", and the pixel Px (mx, my+1, mz) does not exist in the M pixels Px constituting the image formation space SP, the pixel selection portion 221 determines whether or not the value mz corresponding to the pixel Px (mx, my, mz) satisfies "mz=Mz" (S22). In other words, in Step S22, the pixel selection portion 221 determines whether or not the pixel Px (mx, my, mz+1) does not exist in the M pixels Px constituting the image formation space SP.

When the result of the determination in Step S22 is negative, that is, the value mz satisfies "mz<Mz", the pixel selection portion 221 sets the value mx and the value my to "1", adds "1" to the value mz (S23), and proceeds to the processing in Step S11.

On the other hand, when the result of the determination in Step S22 is affirmative, that is, the value mz satisfies "mz=Mz", and the pixel Px (mx, my, mz+1) does not exist in the M pixels Px constituting the image formation space SP, the pixel selection portion 221 ends the display data generation processing illustrated in FIG. 6.

4. Display Data Generation Processing Related to Reference Example

In the following, in order to clarify the effect of the present embodiment, the display data generation processing executed in the recording system according to the reference example will be described with reference to FIGS. 8 to 12.

The recording system according to the reference example is configured in the same manner as the recording system Sys according to the embodiment, except that the error diffusion data GK-Z1 is stored instead of the error diffusion data GK.

Figure 8:
FIG. 8 is an explanatory table illustrating an example of error diffusion data according to a reference example.

FIG. 8 is an explanatory table for describing the error diffusion data GK-Z1.

As illustrated in FIG. 8, when the pixel Px (mx, my, mz) is the target pixel PxT, the error diffusion data GK-Z1 is data that designates the pixel Px (mx+1, my, mz) and the pixel Px (mx, my+1, mz) as the peripheral pixel PxS. That is, the error diffusion data GK-Z1 is different from the error diffusion data GK according to the embodiment in that the pixel Px (mx, my, mz+1) is not designated as the peripheral pixel PxS when the pixel Px (mx, my, mz) is the target pixel PxT.

In addition, the error diffusion data GK-Z1 is data that determines the distribution rate B (1, 0, 0) and the distribution rate B (0, 1, 0) so that the distribution rate B (1, 0, 0) corresponding to the pixel Px (mx+1, my, mz) is larger than the distribution rate B (0, 1, 0) corresponding to the pixel Px (mx, my+1, mz). More specifically, in the reference example, as an example, it is assumed that the error diffusion data GK-Z1 sets the distribution rate B (1, 0, 0) to "10/16" and the distribution rate B (0, 1, 0) to "6/16". That is, in the reference example, in the error distribution processing, the error distribution portion 223 updates the gradation value Gg (mx+1, my, mz) by subtracting the distribution value EB (1, 0, 0), which is a value obtained by multiplying the error E (mx, my, mz) by "10/16", from the gradation value Gg (mx+1, my, mz), and updates the gradation value Gg (mx, my+1, mz) by subtracting the distribution value EB (0, 1, 0), which is a value obtained by multiplying the error E (mx, my, mz) by "6/16", from the gradation value Gg (mx, my+1, mz). In other words, the reference example differs from the embodiment in that the error distribution portion 223 does not distribute the error E to the pixel Px in the Z axis direction of the target pixel PxT in the error distribution processing.

Figure 9:
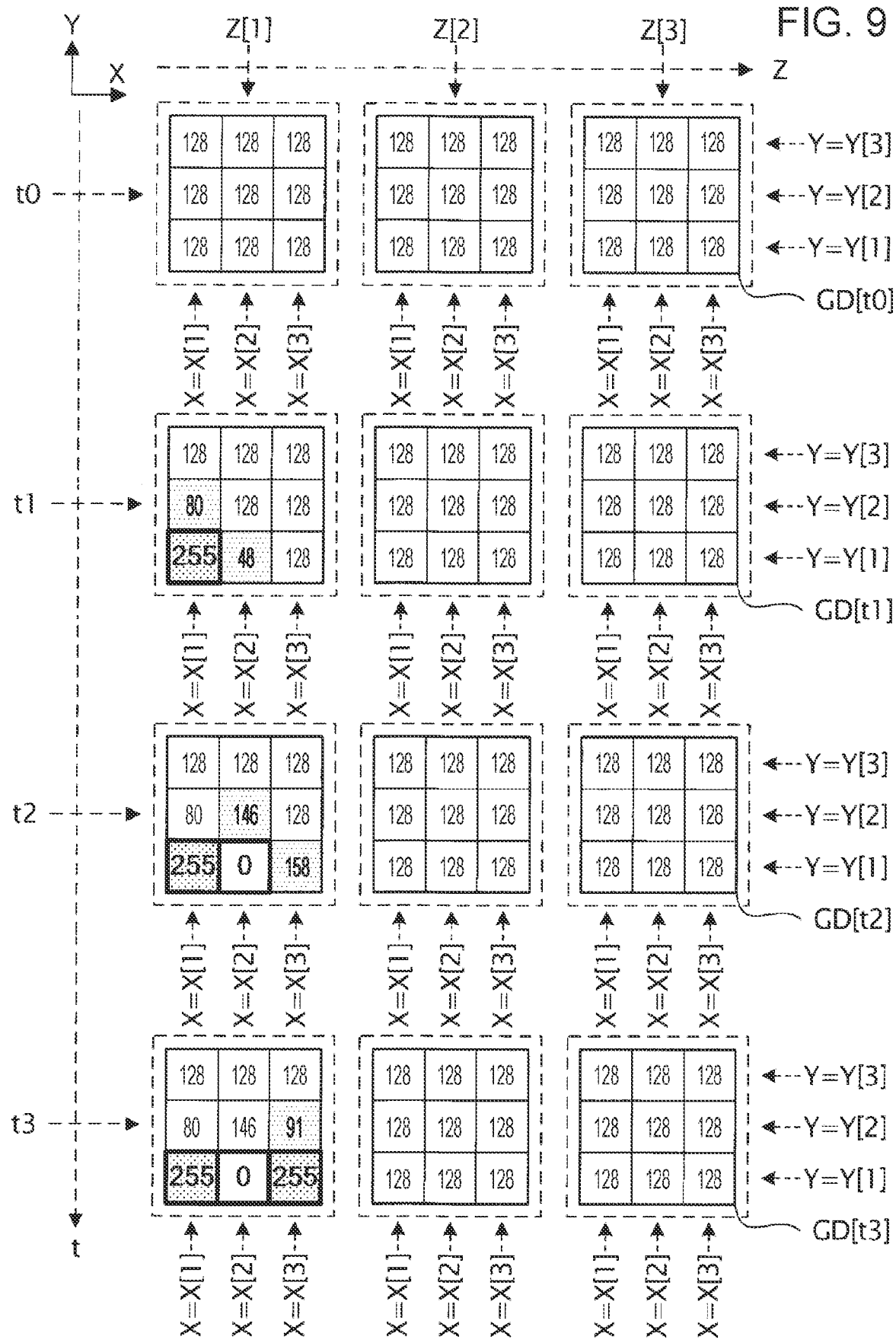
FIG. 9 is an explanatory diagram illustrating an example of display data generation processing according to the reference example.
Figure 10:
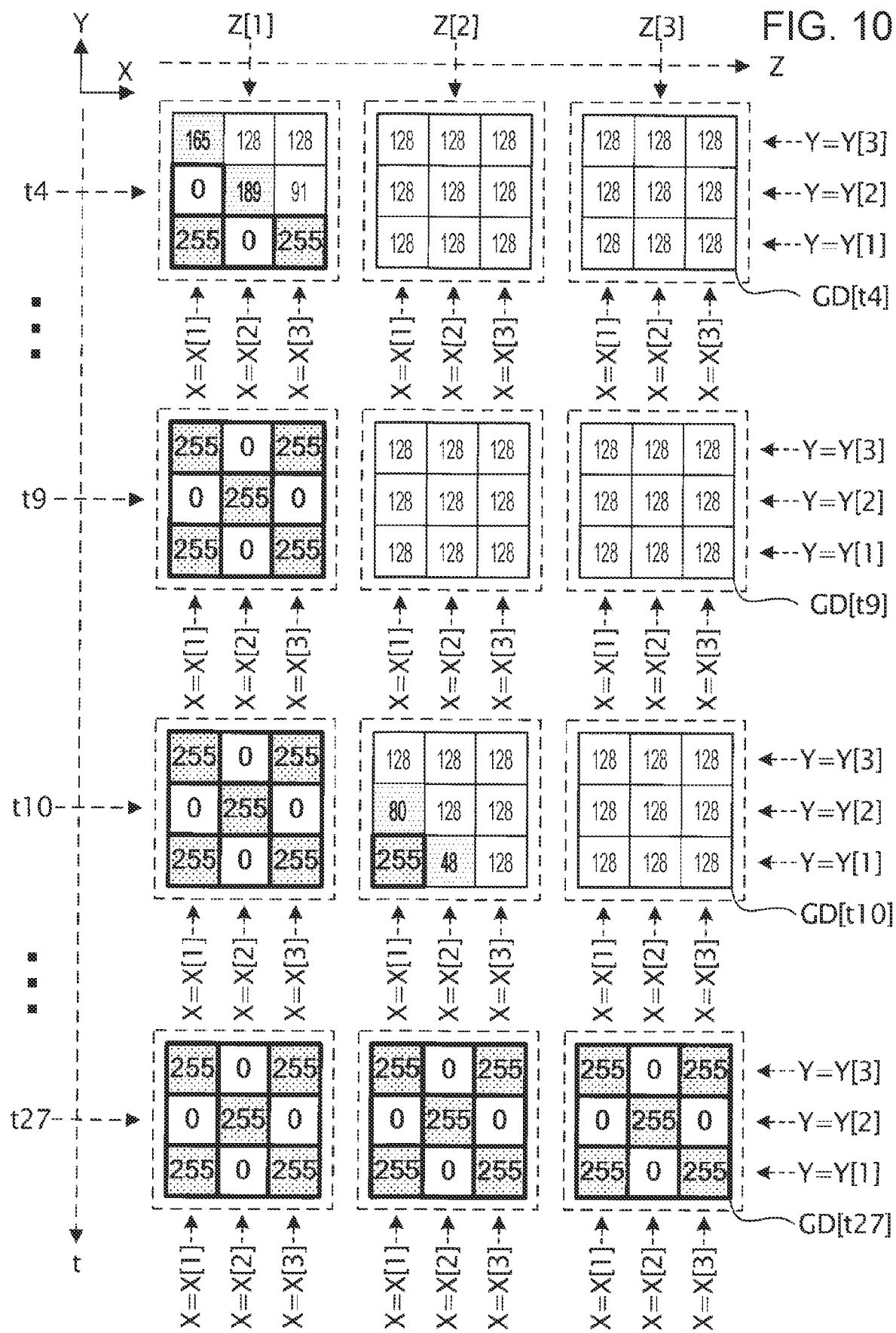
FIG. 10 is an explanatory diagram illustrating an example of display data generation processing according to the reference example.

FIGS. 9 and 10 are explanatory diagrams for describing the display data generation processing according to the reference example.

In the examples illustrated in FIGS. 9 and 10, it is assumed that "Mx=3", "My=3", "Mz=3", "M=3×3×3=27", and 27 pixels Px exist in the image formation space SP. In addition, in the examples illustrated in FIGS. 9 and 10, it is assumed that the gradation value Gg-min is "0", the gradation value Gg-max is "255", and the threshold value Th (mx, my, mz) is "128", similar to the embodiment. In addition, in the examples illustrated in FIGS. 9 and 10, it is assumed that all of the M gradation values Gg (mx, my, mz) corresponding to the M pixels Px (mx, my, mz) constituting the image formation space SP are "128".

As illustrated in FIG. 9, the image data acquisition portion 21 acquires the image data GD so that all of the M gradation values Gg (mx, my, mz) are "128" in the period t0. In the following, the image data GD in the period t may be expressed as the image data GD [t].

Next, the display data generation portion 22 selects the pixel Px (1, 1, 1) as the target pixel PxT in the period t1, and executes the error diffusion processing.

Specifically, in the period t1, the arithmetic processing portion 222 first determines whether or not the gradation value Gg (1, 1, 1) indicated by the image data GD [t0] is equal to or greater than the threshold value Th (1, 1, 1). In the examples illustrated in FIGS. 9 and 10, since the gradation value Gg (1, 1, 1) indicated by the image data GD [t0] is "128", and the threshold value Th (1, 1, 1) is "128", "Gg (1, 1, 1)≥Th (1, 1, 1)" is established. Therefore, the arithmetic processing portion 222 sets the gradation value GI (1, 1, 1) to the maximum gradation value GI-1, that is, "255".

In the period t1, the error distribution portion 223 calculates the error E (1, 1, 1) by subtracting the gradation value Gg (1, 1, 1) indicated by the image data GD [t0] from the value obtained by adding "1" to the gradation value GI (1, 1, 1). In the examples illustrated in FIGS. 9 and 10, the gradation value GI (1, 1, 1) is "255", and the gradation value Gg (1, 1, 1) indicated by the image data GD [t0] is "128". Therefore, the error E (1, 1, 1) is a value obtained by adding "1" to the maximum gradation value GI-1 and further subtracting the gradation value Gg (1, 1, 1), that is, "128".

Next, in the period t1, the error distribution portion 223 calculates the distribution value EB (1, 0, 0) by multiplying the error E (1, 1, 1) and the distribution rate B (1, 0, 0), and changes the gradation value Gg (2, 1, 1) by subtracting the distribution value EB (1, 0, 0) from the gradation value Gg (2, 1, 1) indicated by the image data GD [t0]. In addition, in the period t1, the error distribution portion 223 calculates the distribution value EB (0, 1, 0) by multiplying the error E (1, 1, 1) and the distribution rate B (0, 1, 0), and changes the gradation value Gg (1, 2, 1) by subtracting the distribution value EB (0, 1, 0) from the gradation value Gg (1, 2, 1) indicated by the image data GD [t0].

In the examples illustrated in FIGS. 9 and 10, since the error E (1, 1, 1) is "128", the gradation value Gg (2, 1, 1) indicated by the image data GD [t0] is "128", and the distribution rate B (1, 0, 0) is "10/16", the error distribution portion 223 calculates the distribution value EB (1, 0, 0) as "128×(10/16)", that is, "80" based on the equation (3), further calculates the gradation value Gg (2, 1, 1) indicated by image data GD [t1] based on equation (2) as "128-80", that is, "48", and sets the gradation value Gg (2, 1, 1) indicated by the image data GD [t1] to "48".

Similarly, since the error E (1, 1, 1) is "128", the gradation value Gg (1, 2, 1) indicated by the image data GD [t0] is "128", and the distribution rate B (0, 1, 0) is "6/16", the error distribution portion 223 calculates the distribution value EB (0, 1, 0) as "128×(6/16)", that is, "48" based on the equation (3), further calculates the gradation value Gg (1, 2, 1) indicated by image data GD [t1] based on equation (2) as "128-48", that is, "80", and sets the gradation value Gg (1, 2, 1) indicated by the image data GD [t1] to "80".

In the examples illustrated in FIGS. 9 and 10, the pixel Px (2, 1, 1) exists in the +X direction of the pixel Px (1, 1, 1) selected as the target pixel PxT in the period t1. Therefore, the pixel selection portion 221 selects the pixel Px (2, 1, 1) as the target pixel PxT in the period t2. The display data generation portion 22 executes error diffusion processing in which the pixel Px (2, 1, 1) is set as the target pixel PxT in the period t2.

Specifically, in the period t2, the arithmetic processing portion 222 first determines whether or not the gradation value Gg (2, 1, 1) indicated by the image data GD [t1] is equal to or greater than the threshold value Th (2, 1, 1). In the examples illustrated in FIGS. 9 and 10, since the gradation value Gg (2, 1, 1) indicated by the image data GD [t1] is "48", and the threshold value Th (2, 1, 1) is "128", "Gg (2, 1, 1)<Th (2, 1, 1)" is established. Therefore, the arithmetic processing portion 222 sets the gradation value GI (2, 1, 1) to the minimum gradation value GI-0, that is, "0".

In the period t2, the error distribution portion 223 calculates the error E (2, 1, 1) by subtracting the gradation value Gg (2, 1, 1) indicated by the image data GD [t1] from the gradation value GI (2, 1, 1). In the examples illustrated in FIGS. 9 and 10, since the gradation value GI (2, 1, 1) is "0", and the gradation value Gg (2, 1, 1) indicated by the image data GD [t1] is "48", the error E (2, 1, 1) is a value obtained by subtracting the gradation value Gg (2, 1, 1) from the minimum gradation value GI-0, that is, "−48".

Next, in the period t2, the error distribution portion 223 calculates the distribution value EB (1, 0, 0) by multiplying the error E (2, 1, 1) and the distribution rate B (1, 0, 0), and changes the gradation value Gg (3, 1, 1) by subtracting the distribution value EB (1, 0, 0) from the gradation value Gg (3, 1, 1) indicated by the image data GD [t1]. In addition, in the period t2, the error distribution portion 223 calculates the distribution value EB (0, 1, 0) by multiplying the error E (2, 1, 1) and the distribution rate B (0, 1, 0), and changes the gradation value Gg (2, 2, 1) by subtracting the distribution value EB (0, 1, 0) from the gradation value Gg (2, 2, 1) indicated by the image data GD [t1].

In the examples illustrated in FIGS. 9 and 10, since the error E (2, 1, 1) is "−48", the gradation value Gg (3, 1, 1) indicated by the image data GD [t1] is "128", and the distribution rate B (1, 0, 0) is "10/16", the error distribution portion 223 calculates the distribution value EB (1, 0, 0) as "(−48)×(10/16)", that is, "−30" based on the equation (3), further calculates the gradation value Gg (3, 1, 1) indicated by image data GD [t2] based on equation (2) as "128−(−30)", that is, "158", and sets the gradation value Gg (3, 1, 1) indicated by the image data GD [t2] to "158".

Similarly, since the error E (2, 1, 1) is "−48", the gradation value Gg (2, 2, 1) indicated by the image data GD [t1] is "128", and the distribution rate B (0, 1, 0) is "6/16", the error distribution portion 223 calculates the distribution value EB (0, 1, 0) as "(−48)×(6/16)", that is, "−18" based on the equation (3), further calculates the gradation value Gg (2, 2, 1) indicated by image data GD [t2] based on equation (2) as "128−(−18)", that is, "146", and sets the gradation value Gg (2, 2, 1) indicated by the image data GD [t2] to "146".

In the examples illustrated in FIGS. 9 and 10, the pixel Px (3, 1, 1) exists in the +X direction of the pixel Px (2, 1, 1) selected as the target pixel PxT in the period t2. Therefore, the pixel selection portion 221 selects the pixel Px (3, 1, 1) as the target pixel PxT in the period t3. The display data generation portion 22 executes error diffusion processing in which the pixel Px (3, 1, 1) is set as the target pixel PxT in the period t3.

Specifically, in the period t3, the arithmetic processing portion 222 first determines whether or not the gradation value Gg (3, 1, 1) indicated by the image data GD [t2] is equal to or greater than the threshold value Th (3, 1, 1). In the examples illustrated in FIGS. 9 and 10, since the gradation value Gg (3, 1, 1) indicated by the image data GD [t2] is "158", and the threshold value Th (3, 1, 1) is "128", "Gg (3, 1, 1)≥Th (3, 1, 1)" is established. Therefore, the arithmetic processing portion 222 sets the gradation value GI (3, 1, 1) to the maximum gradation value GI-1, that is, "255".

In the period t3, the error distribution portion 223 calculates the error E (3, 1, 1) by subtracting the gradation value Gg (3, 1, 1) indicated by the image data GD [t2] from the value obtained by adding "1" to the gradation value GI (3, 1, 1). In the examples illustrated in FIGS. 9 and 10, since the gradation value GI (3, 1, 1) is "255", and the gradation value Gg (3, 1, 1) indicated by the image data GD [t2] is "158", the error E (3, 1, 1) is "98".

Next, in the period t3, the error distribution portion 223 calculates the distribution value EB (0, 1, 0) by multiplying the error E (3, 1, 1) and the distribution rate B (0, 1, 0), and changes the gradation value Gg (3, 2, 1) by subtracting the distribution value EB (0, 1, 0) from the gradation value Gg (3, 2, 1) indicated by the image data GD [t2]. Since the pixel Px does not exist in the +X direction of the pixel Px (3, 1, 1), the error distribution portion 223 does not calculate the distribution value EB (1, 0, 0) in the period t3. In the examples illustrated in FIGS. 9 and 10, since the error E (3, 1, 1) is "98", and the gradation value Gg (3, 2, 1) indicated by the image data GD [t2] is "128", the error distribution portion 223 sets the gradation value Gg (3, 2, 1) indicated by the image data GD [t3] to "91".

In the examples illustrated in FIGS. 9 and 10, the pixel Px does not exist in the +X direction of the pixel Px (3, 1, 1) selected as the target pixel PxT in the period t3. On the other hand, the pixel Px exists in the +Y direction of the pixel Px (3, 1, 1) selected as the target pixel PxT in the period t3. Therefore, the pixel selection portion 221 selects the pixel Px (1, 2, 1) as the target pixel PxT in the period t4. The display data generation portion 22 executes error diffusion processing in which the pixel Px (1, 2, 1) is set as the target pixel PxT in the period t4.

Specifically, in the period t4, the arithmetic processing portion 222 first determines whether or not the gradation value Gg (1, 2, 1) indicated by the image data GD [t3] is equal to or greater than the threshold value Th (1, 2, 1). In the examples illustrated in FIGS. 9 and 10, since the gradation value Gg (1, 2, 1) indicated by the image data GD [t3] is "80", and the threshold value Th (1, 2, 1) is "128", "Gg (1, 2, 1)<Th (1, 2, 1)" is established. Therefore, the arithmetic processing portion 222 sets the gradation value GI (1, 2, 1) to the minimum gradation value GI-0, that is, "0".

In the period t4, the error distribution portion 223 calculates the error E (1, 2, 1) by subtracting the gradation value Gg (1, 2, 1) indicated by the image data GD [t3] from the gradation value GI (1, 2, 1). In the examples illustrated in FIGS. 9 and 10, since the gradation value GI (1, 2, 1) is "0", and the gradation value Gg (1, 2, 1) indicated by the image data GD [t3] is "80", the error E (1, 2, 1) is "−80".

Next, in the period t4, the error distribution portion 223 calculates the distribution value EB (1, 0, 0) by multiplying the error E (1, 2, 1) and the distribution rate B (1, 0, 0), and changes the gradation value Gg (2, 2, 1) by subtracting the distribution value EB (1, 0, 0) from the gradation value Gg (2, 2, 1) indicated by the image data GD [t3]. In addition, in the period t4, the error distribution portion 223 calculates the distribution value EB (0, 1, 0) by multiplying the error E (1, 2, 1) and the distribution rate B (0, 1, 0), and changes the gradation value Gg (1, 3, 1) by subtracting the distribution value EB (0, 1, 0) from the gradation value Gg (1, 3, 1) indicated by the image data GD [t3]. In the examples illustrated in FIGS. 9 and 10, since the error E (1, 2, 1) is "−80", the gradation value Gg (2, 2, 1) indicated by the image data GD [t3] is "146", and the gradation value Gg (1, 3, 1) indicated by the image data GD [t3] is "128", the error distribution portion 223 sets the gradation value Gg (2, 2, 1) indicated by the image data GD [t4] to "189" and sets the gradation value Gg (1, 3, 1) indicated by the image data GD [t4] to "165".

Thereafter, the display data generation portion 22 executes error diffusion processing in which the pixel Px (2, 2, 1), the pixel Px (3, 2, 1), the pixel Px (1, 3, 1), and the pixel Px (2, 3, 1), and the pixel Px (3, 3, 1) are set as the target pixel PxT in the period t5 to the period t9.

In the examples illustrated in FIGS. 9 and 10, the pixel Px does not exist in the +X direction of the pixel Px (3, 3, 1) selected as the target pixel PxT in the period t9. In addition, the pixel Px does not exist in the +Y direction of the pixel Px (3, 3, 1) selected as the target pixel PxT in the period t9. On the other hand, the pixel Px exists in the +Z direction of the pixel Px (3, 3, 1) selected as the target pixel PxT in the period t9. Therefore, the pixel selection portion 221 selects the pixel Px (1, 1, 2) as the target pixel PxT in the period t10. The display data generation portion 22 executes error diffusion processing in which the pixel Px (1, 1, 2) is set as the target pixel PxT in the period t10.

Specifically, in the period t10, the arithmetic processing portion 222 first determines whether or not the gradation value Gg (1, 1, 2) indicated by the image data GD [t9] is equal to or greater than the threshold value Th (1, 1, 2). In the examples illustrated in FIGS. 9 and 10, since the gradation value Gg (1, 1, 2) indicated by the image data GD [t9] is "128", and the threshold value Th (1, 1, 2) is "128", "Gg (1, 1, 2)≥Th (1, 1, 2)" is established. Therefore, the arithmetic processing portion 222 sets the gradation value GI (1, 1, 2) to the maximum gradation value GI-1, that is, "255".

In the period t10, the error distribution portion 223 calculates the error E (1, 1, 2) by subtracting the gradation value Gg (1, 1, 2) indicated by the image data GD [t9] from the value obtained by adding "1" to the gradation value GI (1, 1, 2). In the examples illustrated in FIGS. 9 and 10, since the gradation value GI (1, 1, 2) is "255", and the gradation value Gg (1, 1, 2) indicated by the image data GD [t9] is "128", the error E (1, 1, 2) is "128".

Next, in the period t10, the error distribution portion 223 calculates the distribution value EB (1, 0, 0) by multiplying the error E (1, 1, 2) and the distribution rate B (1, 0, 0), and changes the gradation value Gg (2, 1, 2) by subtracting the distribution value EB (1, 0, 0) from the gradation value Gg (2, 1, 2) indicated by the image data GD [t9]. In addition, in the period t10, the error distribution portion 223 calculates the distribution value EB (0, 1, 0) by multiplying the error E (1, 1, 2) and the distribution rate B (0, 1, 0), and changes the gradation value Gg (1, 2, 2) by subtracting the distribution value EB (0, 1, 0) from the gradation value Gg (1, 2, 2) indicated by the image data GD [t9]. In the examples illustrated in FIGS. 9 and 10, since the error E (1, 1, 2) is "128", the gradation value Gg (2, 1, 2) indicated by the image data GD [t9] is "128", and the gradation value Gg (1, 2, 2) indicated by the image data GD [t9] is "128", the error distribution portion 223 sets the gradation value Gg (2, 1, 2) indicated by the image data GD [t10] to "48" and sets the gradation value Gg (1, 2, 2) indicated by the image data GD [t10] to "80".

Thereafter, the display data generation portion 22 executes error diffusion processing in which the pixels Px (2, 1, 2) to the pixels Px (3, 3, 3) are set as the target pixels PxT in the period t11 to the period t27.

As a result, as illustrated in FIG. 10, in the reference example, in the period t27, the display data Img is generated so that the gradation value GI (1, 1, 1), the gradation value GI (3, 1, 1), the gradation value GI (2, 2, 1), the gradation value GI (1, 3, 1), the gradation value GI (3, 3, 1), the gradation value GI (1, 1, 2), the gradation value GI (3, 1, 2), the gradation value GI (2, 2, 2), the gradation value GI (1, 3, 2), the gradation value GI (3, 3, 2), the gradation value GI (1, 1, 3), the gradation value GI (3, 1, 3), the gradation value GI (2, 2, 3), the gradation value GI (1, 3, 3), and the gradation value GI (3, 3, 3) are the maximum gradation value GI-1, and the gradation values GI (mx, my, mz) other than these values are the minimum gradation value GI-0. That is, in the reference example, as illustrated in FIG. 10, the display data Img can be generated so that the dispersibility of the dot formation pixel Px-1 in which the gradation value GI (mx, my, mz) is the maximum gradation value GI-1 is increased in the plane parallel to the XY plane.

Figure 11:
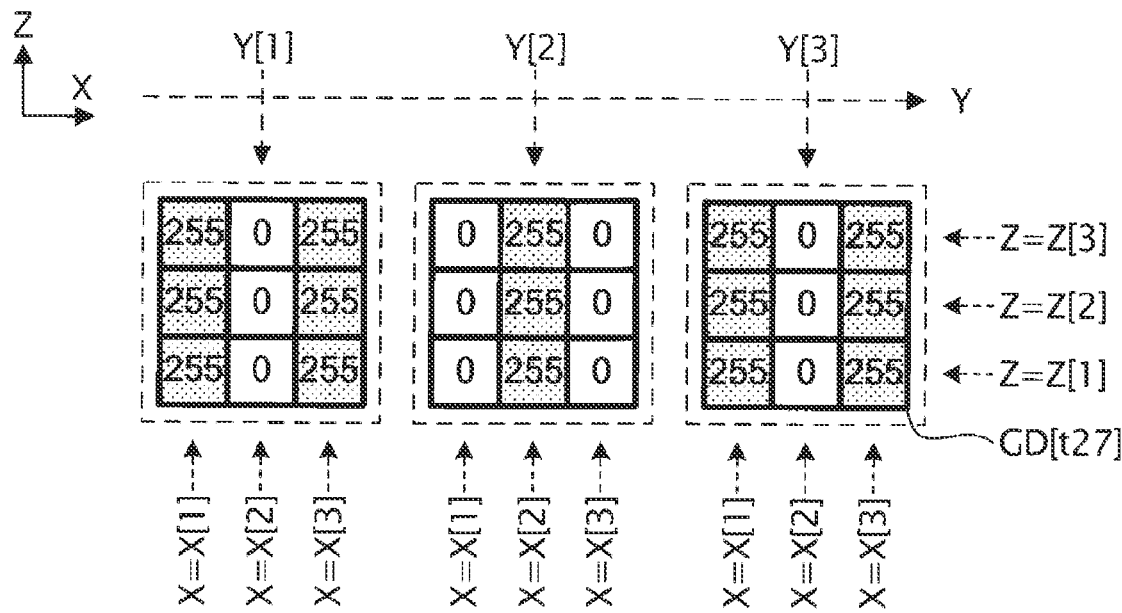
FIG. 11 is an explanatory diagram illustrating an example of display data according to the reference example.
Figure 12:
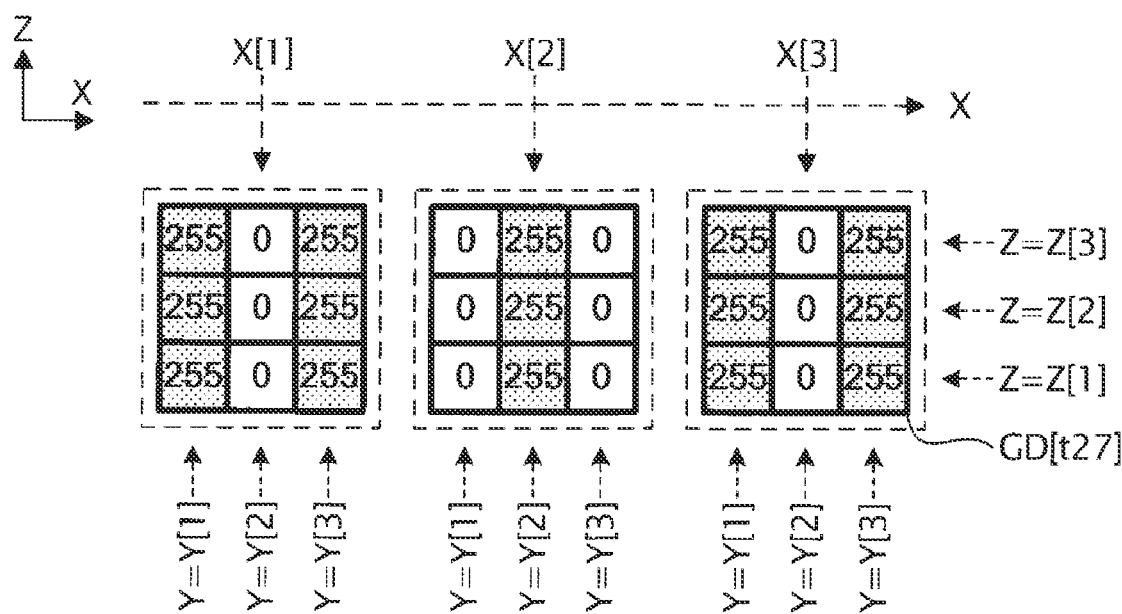
FIG. 12 is an explanatory diagram illustrating an example of display data according to the reference example.

FIGS. 11 and 12 are explanatory diagrams for describing the display data Img according to the reference example generated in the period t27. Of these, FIG. 11 is a diagram illustrating the display data Img according to the reference example on a plane parallel to the XZ plane, and FIG. 12 is a diagram illustrating the display data Img according to the reference example on a plane parallel to the YZ plane.

As illustrated in FIGS. 11 and 12, in the reference example, the dot formation pixels Px-1 in which the gradation value GI (mx, my, mz) is the maximum gradation value GI-1 are formed so as to be continuous in the Z axis direction at the positions of X=X [1] and Y=Y [1], the positions of X=X [1] and Y=Y [3], the positions of X=X [2] and Y=Y [2], the positions of X=X [3] and Y=Y [1], and the positions of X=X [3] and Y=Y [3]. In other words, in the reference example, in the error distribution processing, only the error E is distributed in the XY plane, and the error E is not distributed in the Z axis direction. Therefore, the arrangement of the value of the display data Img in Z=Z [1], the arrangement of the value of the display data Img in Z=Z [2], and the arrangement of the value of the display data Img in Z=Z [3] are the same each other. Therefore, in the reference example, when the surface SF of the object Obj has a plane parallel to the XZ plane or a plane parallel to the YZ plane, a streak pattern extending in the Z axis direction is formed in the plane. In other words, in the reference example, the dispersibility of the dot formation pixel Px-1 cannot be increased in the plane parallel to the XZ plane and the plane parallel to the YZ plane. Therefore, in the reference example, when the image G of the intermediate gradation is formed on the plane parallel to the XZ plane and the plane parallel to the YZ plane among the surface SFs of the object Obj, there is a problem that the image quality of the image G deteriorates.

In the reference example, although the display data generation processing was executed using the error diffusion data GK-Z1 as illustrated in FIG. 8, the display data generation processing may be executed using the error diffusion data GK-Z2 as illustrated in FIG. 13, or the display data generation processing may be executed using the error diffusion data GK-Z3 as illustrated in FIG. 14.

FIG. 13 is an explanatory table for describing the error diffusion data GK-Z2.

As illustrated in FIG. 13, when the pixel Px (mx, my, mz) is the target pixel PxT, the error diffusion data GK-Z2 is data in which the pixel Px (mx+1, my, mz) and the pixel Px (mx, my+1, Mz), the pixel Px (mx+1, my+1, mz), and the pixel Px (mx−1, my+1, mz) are designated as the peripheral pixels PxS.

In addition, the error diffusion data GK-Z2 is data that determines each distribution rate B so that the distribution rate B (1, 0, 0) is larger than the distribution rate B (0, 1, 0), the distribution rate B (0, 1, 0) is larger than the distribution rate B (1, 1, 0), the distribution rate B (−1, 1, 0) is larger than the distribution rate B (1, 1, 0), and the distribution rate B (0, 1, 0) is larger than the distribution rate B (−1, 1, 0).

FIG. 14 is an explanatory table for describing the error diffusion data GK-Z3.

As illustrated in FIG. 14, when the pixel Px (mx, my, mz) is the target pixel PxT, the error diffusion data GK-Z3 is data in which the pixel Px (mx+1, my, mz), the pixel Px (mx+2, my, Mz), the pixel Px (mx−2, my+1, mz), the pixel Px (mx−1, my+1, mz), the pixel Px (mx, my+1, mz), the pixel Px (mx+1, my+1, mz), the pixel Px (mx+2, my+1, mz), the pixel Px (mx−2, my+2, mz), the pixel Px (mx−1, my+2, mz), the pixel Px (mx, my+2, mz), the pixel Px (mx+1, my+2, mz), and the pixel Px (mx+2, my+2, mz) are designated as the peripheral pixels PxS.

In addition, the error diffusion data GK-Z3 is data that determines each distribution rate B so that the distribution rate B (1, 0, 0) and the distribution rate B (0, 1, 0) are larger than the distribution rate B (2, 0, 0), the distribution rate B (−1, 1, 0), the distribution rate B (1, 1, 0), and the distribution rate B (0, 2, 0), the distribution rate B (2, 0, 0), the distribution rate B (−1, 1, 0), the distribution rate B (1, 1, 0), and the distribution rate B (0, 2, 0) are larger than the distribution rate B (−2, 1, 0), the distribution rate B (2, 1, 0), the distribution rate B (−1, 2, 0), and the distribution rate B (1, 2, 0), and the distribution rate B (−2, 1, 0), the distribution rate B (2, 1, 0), the distribution rate B (−1, 2, 0), and the distribution rate B (1, 2, 0) are larger than the distribution rate B (−2, 2, 0) and the distribution rate B (2, 2, 0).

As described above, the error diffusion data GK-Z2 and the error diffusion data GK-Z3 are data that determines that only the error E is distributed in the XY plane and the error E is not distributed in the Z axis direction. Therefore, in the reference example, even when the display data generation processing is executed using the error diffusion data GK-Z2 or the error diffusion data GK-Z3 instead of the error diffusion data GK-Z1, only the error E is distributed in the XY plane, and the error E is not distributed in the Z axis direction in the error distribution processing. Therefore, in the reference example, even when the display data generation processing is executed using the error diffusion data GK-Z2 or the error diffusion data GK-Z3 instead of the error diffusion data GK-Z1, there is still a problem that the dispersibility of the dot formation pixel Px-1 cannot be increased and the image quality of the image G formed on the surface SF of the object Obj is deteriorated on a plane parallel to the XZ plane and a plane parallel to the YZ plane.

5. Display Data Generation Processing Related to Present Embodiment

In the following, the display data generation processing executed in the recording system Sys will be described with reference to FIGS. 15 to 18.

As described above, the recording system Sys executes the error diffusion processing using the error diffusion data GK illustrated in FIG. 7. As described above, when the pixel Px (mx, my, mz) is the target pixel PxT, the error diffusion data GK is data in which the pixel Px (mx+1, my, mz), the pixel Px (mx, my+1, mz), and the pixel Px (mx, my, mz+1) are designated as the peripheral pixels PxS.

In addition, as described above, the error diffusion data GK is data that determines the distribution rate B (1, 0, 0), the distribution rate B (0, 1, 0), the distribution rate B (0, 0, 1) so that the distribution rate B (1, 0, 0) is larger than the distribution rate B (0, 1, 0), and the distribution rate B (0, 1, 0) is larger than the distribution rate B (0, 0, 1). In other words, the present embodiment differs from the reference example in that the error distribution portion 223 distributes the error E to the pixel Px in the Z axis direction of the target pixel PxT in the error distribution processing. Also in the examples illustrated in FIGS. 15 to 18, it is assumed that the distribution rate B (1, 0, 0) is "8/16", the distribution rate B (0, 1, 0) is "5/16", and the distribution rate B (0, 0, 1) is "3/16".

Figure 15:
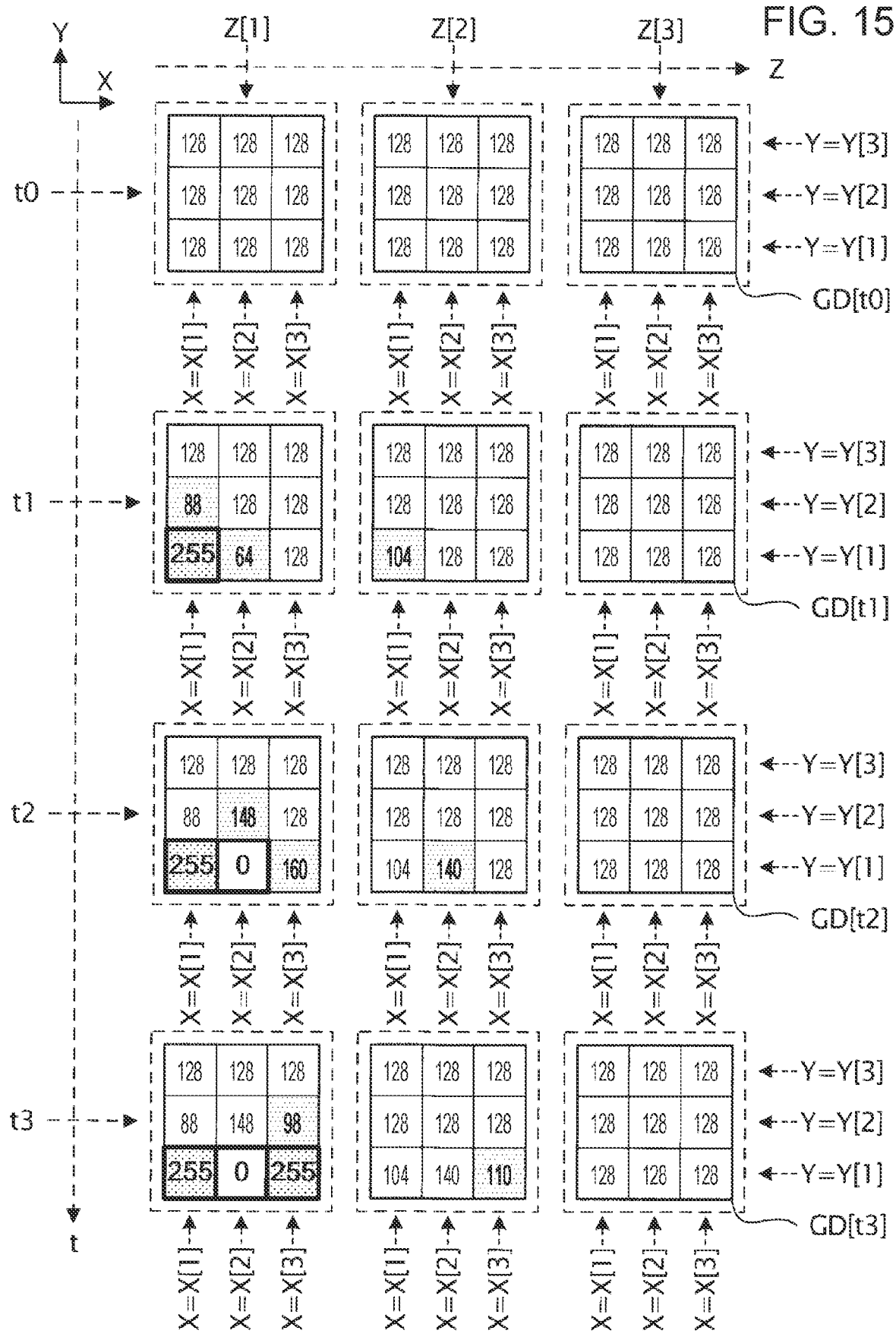
FIG. 15 is an explanatory diagram illustrating an example of display data generation processing.
Figure 16:
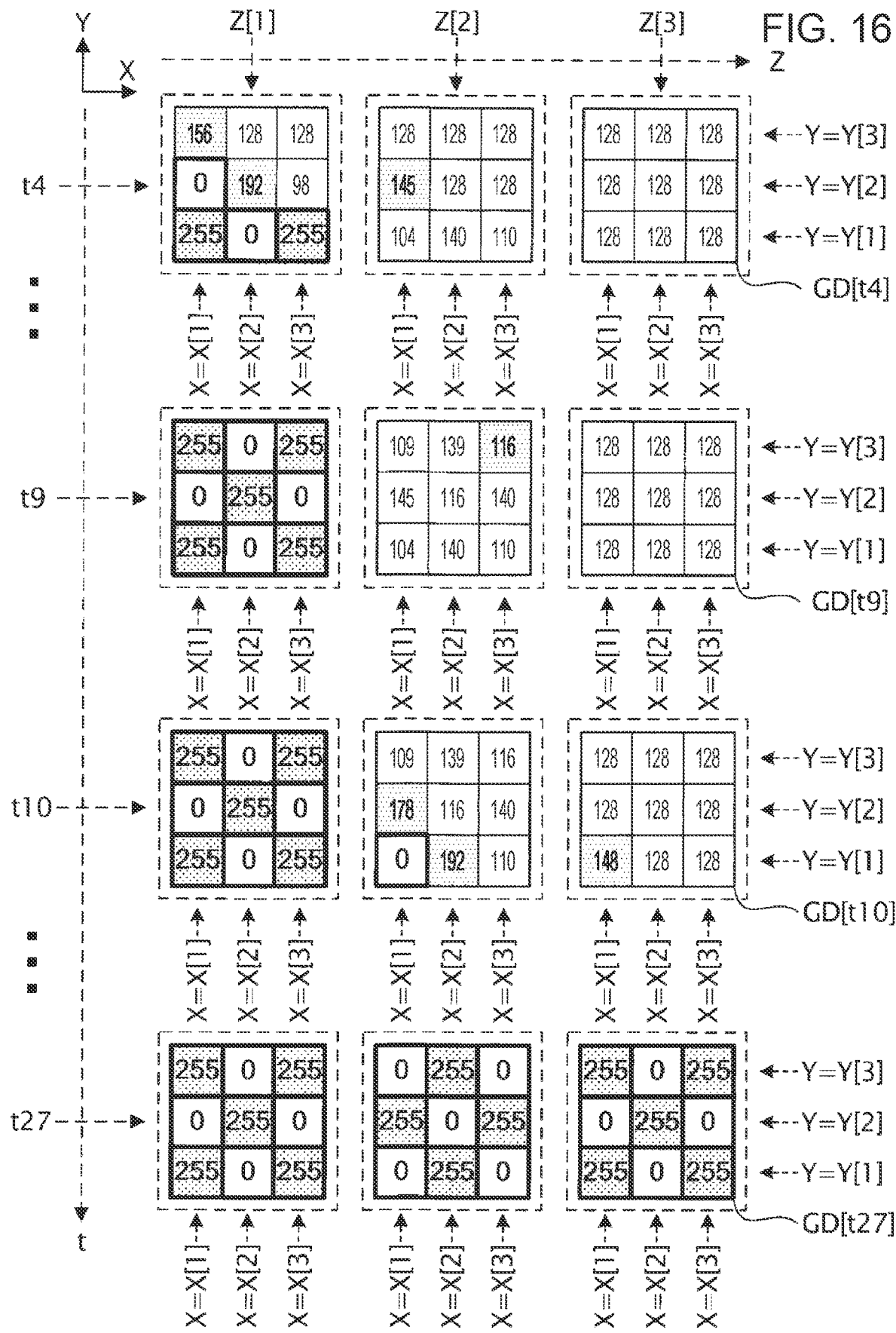
FIG. 16 is an explanatory diagram illustrating an example of display data generation processing.

FIGS. 15 and 16 are explanatory diagrams for describing the display data generation processing according to the present embodiment.

In the examples illustrated in FIGS. 15 and 16, similarly to the examples illustrated in FIGS. 9 and 10, it is assumed that "Mx=3", "My=3", "Mz=3", "M=3×3×3=27", and 27 pixels Px exist in the image formation space SP. In addition, in the examples illustrated in FIGS. 15 and 16, it is assumed that the gradation value Gg-min is "0", the gradation value Gg-max is "255", and the threshold value Th (mx, my, mz) is "128", similar to the examples illustrated in FIGS. 9 and 10. In addition, in the examples illustrated in FIGS. 15 and 16, it is assumed that all of the M gradation values Gg (mx, my, mz) corresponding to the M pixels Px (mx, my, mz) constituting the image formation space SP are "128".

As illustrated in FIG. 15, the image data acquisition portion 21 acquires the image data GD [t0] so that all of the M gradation values Gg (mx, my, mz) are "128" in the period t0.

Next, the display data generation portion 22 selects the pixel Px (1, 1, 1) as the target pixel PxT in the period t1, and executes the error diffusion processing.

Specifically, in the period t1, the arithmetic processing portion 222 first determines whether or not the gradation value Gg (1, 1, 1) indicated by the image data GD [t0] is equal to or greater than the threshold value Th (1, 1, 1). In the examples illustrated in FIGS. 15 and 16, since the gradation value Gg (1, 1, 1) indicated by the image data GD [t0] is "128", and the threshold value Th (1, 1, 1) is "128", "Gg (1, 1, 1)≥Th (1, 1, 1)" is established. Therefore, the arithmetic processing portion 222 sets the gradation value GI (1, 1, 1) to the maximum gradation value GI-1, that is, "255".

In the period t1, the error distribution portion 223 calculates the error E (1, 1, 1) by subtracting the gradation value Gg (1, 1, 1) indicated by the image data GD [t0] from the value obtained by adding "1" to the gradation value GI (1, 1, 1). In the examples illustrated in FIGS. 15 and 16, the gradation value GI (1, 1, 1) is "255", and the gradation value Gg (1, 1, 1) indicated by the image data GD [t0] is "128". Therefore, the error E (1, 1, 1) is a value obtained by adding "1" to the maximum gradation value GI-1 and further subtracting the gradation value Gg (1, 1, 1), that is, "128".

Next, in the period t1, the error distribution portion 223 calculates the distribution value EB (1, 0, 0) by multiplying the error E (1, 1, 1) and the distribution rate B (1, 0, 0), and changes the gradation value Gg (2, 1, 1) by subtracting the distribution value EB (1, 0, 0) from the gradation value Gg (2, 1, 1) indicated by the image data GD [t0]. In addition, in the period t1, the error distribution portion 223 calculates the distribution value EB (0, 1, 0) by multiplying the error E (1, 1, 1) and the distribution rate B (0, 1, 0), and changes the gradation value Gg (1, 2, 1) by subtracting the distribution value EB (0, 1, 0) from the gradation value Gg (1, 2, 1) indicated by the image data GD [t0]. In addition, in the period t1, the error distribution portion 223 calculates the distribution value EB (0, 0, 1) by multiplying the error E (1, 1, 1) and the distribution rate B (0, 0, 1), and changes the gradation value Gg (1, 1, 2) by subtracting the distribution value EB (0, 0, 1) from the gradation value Gg (1, 1, 2) indicated by the image data GD [t0].

In the examples illustrated in FIGS. 15 and 16, since the error E (1, 1, 1) is "128", the gradation value Gg (2, 1, 1) indicated by the image data GD [t0] is "128", and the distribution rate B (1, 0, 0) is "8/16", the error distribution portion 223 calculates the distribution value EB (1, 0, 0) as "128×(8/16)", that is, "64" based on the equation (3), further calculates the gradation value Gg (2, 1, 1) indicated by image data GD [t1] based on equation (2) as "128-64", that is, "64", and sets the gradation value Gg (2, 1, 1) indicated by the image data GD [t1] to "64".

Similarly, since the error E (1, 1, 1) is "128", the gradation value Gg (1, 2, 1) indicated by the image data GD [t0] is "128", and the distribution rate B (0, 1, 0) is "5/16", the error distribution portion 223 calculates the distribution value EB (0, 1, 0) as "128×(5/16)", that is, "40" based on the equation (3), further calculates the gradation value Gg (1, 2, 1) indicated by image data GD [t1] based on equation (2) as "128-40", that is, "88", and sets the gradation value Gg (1, 2, 1) indicated by the image data GD [t1] to "88".

Similarly, since the error E (1, 1, 1) is "128", the gradation value Gg (1, 1, 2) indicated by the image data GD [t0] is "128", and the distribution rate B (0, 0, 1) is "3/16", the error distribution portion 223 calculates the distribution value EB (0, 0, 1) as "128×(3/16)", that is, "24" based on the equation (3), further calculates the gradation value Gg (1, 1, 2) indicated by image data GD [t1] based on equation (2) as "128-24", that is, "104", and sets the gradation value Gg (1, 1, 2) indicated by the image data GD [t1] to "104".

In the examples illustrated in FIGS. 15 and 16, the pixel Px (2, 1, 1) exists in the +X direction of the pixel Px (1, 1, 1) selected as the target pixel PxT in the period t1. Therefore, the pixel selection portion 221 selects the pixel Px (2, 1, 1) as the target pixel PxT in the period t2. The display data generation portion 22 executes error diffusion processing in which the pixel Px (2, 1, 1) is set as the target pixel PxT in the period t2.

Specifically, in the period t2, the arithmetic processing portion 222 first determines whether or not the gradation value Gg (2, 1, 1) indicated by the image data GD [t1] is equal to or greater than the threshold value Th (2, 1, 1). In the examples illustrated in FIGS. 15 and 16, since the gradation value Gg (2, 1, 1) indicated by the image data GD [t1] is "64", and the threshold value Th (2, 1, 1) is "128", "Gg (2, 1, 1)<Th (2, 1, 1)" is established. Therefore, the arithmetic processing portion 222 sets the gradation value GI (2, 1, 1) to the minimum gradation value GI-0, that is, "0".

In the period t2, the error distribution portion 223 calculates the error E (2, 1, 1) by subtracting the gradation value Gg (2, 1, 1) indicated by the image data GD [t1] from the gradation value GI (2, 1, 1). In the examples illustrated in FIGS. 15 and 16, since the gradation value GI (2, 1, 1) is "0", and the gradation value Gg (2, 1, 1) indicated by the image data GD [t1] is "64", the error E (2, 1, 1) is a value obtained by subtracting the gradation value Gg (2, 1, 1) from the minimum gradation value GI-0, that is, "−64".

Next, in the period t2, the error distribution portion 223 calculates the distribution value EB (1, 0, 0) by multiplying the error E (2, 1, 1) and the distribution rate B (1, 0, 0), and changes the gradation value Gg (3, 1, 1) by subtracting the distribution value EB (1, 0, 0) from the gradation value Gg (3, 1, 1) indicated by the image data GD [t1]. In addition, in the period t2, the error distribution portion 223 calculates the distribution value EB (0, 1, 0) by multiplying the error E (2, 1, 1) and the distribution rate B (0, 1, 0), and changes the gradation value Gg (2, 2, 1) by subtracting the distribution value EB (0, 1, 0) from the gradation value Gg (2, 2, 1) indicated by the image data GD [t1]. In addition, in the period t2, the error distribution portion 223 calculates the distribution value EB (0, 0, 1) by multiplying the error E (2, 1, 1) and the distribution rate B (0, 0, 1), and changes the gradation value Gg (2, 1, 2) by subtracting the distribution value EB (0, 1, 0) from the gradation value Gg (2, 1, 2) indicated by the image data GD [t1].

In the examples illustrated in FIGS. 15 and 16, since the error E (2, 1, 1) is "−64", the gradation value Gg (3, 1, 1) indicated by the image data GD [t1] is "128", and the distribution rate B (1, 0, 0) is "8/16", the error distribution portion 223 calculates the distribution value EB (1, 0, 0) as "(−64)×(8/16)", that is, "−32" based on the equation (3), further calculates the gradation value Gg (3, 1, 1) indicated by image data GD [t2] based on equation (2) as "128−(−32)", that is, "160", and sets the gradation value Gg (3, 1, 1) indicated by the image data GD [t2] to "160".

Similarly, since the error E (2, 1, 1) is "−64", the gradation value Gg (2, 2, 1) indicated by the image data GD [t1] is "128", and the distribution rate B (0, 1, 0) is "5/16", the error distribution portion 223 calculates the distribution value EB (0, 1, 0) as "(−64)×(5/16)", that is, "−20" based on the equation (3), further calculates the gradation value Gg (2, 2, 1) indicated by image data GD [t2] based on equation (2) as "128−(−20)", that is, "148", and sets the gradation value Gg (2, 2, 1) indicated by the image data GD [t2] to "148".

Similarly, since the error E (2, 1, 1) is "−64", the gradation value Gg (2, 1, 2) indicated by the image data GD [t1] is "128", and the distribution rate B (0, 0, 1) is "3/16", the error distribution portion 223 calculates the distribution value EB (0, 0, 1) as "(−64)×(3/16)", that is, "−12" based on the equation (3), further calculates the gradation value Gg (2, 1, 2) indicated by image data GD [t2] based on equation (2) as "128−(−12)", that is, "140", and sets the gradation value Gg (2, 1, 2) indicated by the image data GD [t2] to "140".

In the examples illustrated in FIGS. 15 and 16, the pixel Px (3, 1, 1) exists in the +X direction of the pixel Px (2, 1, 1) selected as the target pixel PxT in the period t2. Therefore, the pixel selection portion 221 selects the pixel Px (3, 1, 1) as the target pixel PxT in the period t3. The display data generation portion 22 executes error diffusion processing in which the pixel Px (3, 1, 1) is set as the target pixel PxT in the period t3.

Specifically, in the period t3, the arithmetic processing portion 222 first determines whether or not the gradation value Gg (3, 1, 1) indicated by the image data GD [t2] is equal to or greater than the threshold value Th (3, 1, 1). In the examples illustrated in FIGS. 15 and 16, since the gradation value Gg (3, 1, 1) indicated by the image data GD [t2] is "160", and the threshold value Th (3, 1, 1) is "128", "Gg (3, 1, 1)≥Th (3, 1, 1)" is established. Therefore, the arithmetic processing portion 222 sets the gradation value GI (3, 1, 1) to the maximum gradation value GI-1, that is, "255".

In the period t3, the error distribution portion 223 calculates the error E (3, 1, 1) by subtracting the gradation value Gg (3, 1, 1) indicated by the image data GD [t2] from the value obtained by adding "1" to the gradation value GI (3, 1, 1). In the examples illustrated in FIGS. 9 and 10, since the gradation value GI (3, 1, 1) is "255", and the gradation value Gg (3, 1, 1) indicated by the image data GD [t2] is "160", the error E (3, 1, 1) is "96".

Next, in the period t3, the error distribution portion 223 calculates the distribution value EB (0, 1, 0) by multiplying the error E (3, 1, 1) and the distribution rate B (0, 1, 0), and changes the gradation value Gg (3, 2, 1) by subtracting the distribution value EB (0, 1, 0) from the gradation value Gg (3, 2, 1) indicated by the image data GD [t2]. In addition, in the period t3, the error distribution portion 223 calculates the distribution value EB (0, 0, 1) by multiplying the error E (3, 1, 1) and the distribution rate B (0, 0, 1), and changes the gradation value Gg (3, 1, 2) by subtracting the distribution value EB (0, 0, 1) from the gradation value Gg (3, 1, 2) indicated by the image data GD [t2]. Since the pixel Px does not exist in the +X direction of the pixel Px (3, 1, 1), the error distribution portion 223 does not calculate the distribution value EB (1, 0, 0) in the period t3. In the examples illustrated in FIGS. 15 and 16, since the error E (3, 1, 1) is "96", the gradation value Gg (3, 2, 1) indicated by the image data GD [t2] is "128", and the gradation value Gg (3, 1, 2) indicated by the image data GD [t2] is "128", the error distribution portion 223 sets the gradation value Gg (3, 2, 1) indicated by the image data GD [t3] to "98" and sets the gradation value Gg (3, 1, 2) indicated by the image data GD [t3] to "110".

In the examples illustrated in FIGS. 15 and 16, the pixel Px does not exist in the +X direction of the pixel Px (3, 1, 1) selected as the target pixel PxT in the period t3. On the other hand, the pixel Px exists in the +Y direction of the pixel Px (3, 1, 1) selected as the target pixel PxT in the period t3. Therefore, the pixel selection portion 221 selects the pixel Px (1, 2, 1) as the target pixel PxT in the period t4. The display data generation portion 22 executes error diffusion processing in which the pixel Px (1, 2, 1) is set as the target pixel PxT in the period t4.

Specifically, in the period t4, the arithmetic processing portion 222 first determines whether or not the gradation value Gg (1, 2, 1) indicated by the image data GD [t3] is equal to or greater than the threshold value Th (1, 2, 1). In the examples illustrated in FIGS. 15 and 16, since the gradation value Gg (1, 2, 1) indicated by the image data GD [t3] is "88", and the threshold value Th (1, 2, 1) is "128", "Gg (1, 2, 1)<Th (1, 2, 1)" is established. Therefore, the arithmetic processing portion 222 sets the gradation value GI (1, 2, 1) to the minimum gradation value GI-0, that is, "0".

In the period t4, the error distribution portion 223 calculates the error E (1, 2, 1) by subtracting the gradation value Gg (1, 2, 1) indicated by the image data GD [t3] from the gradation value GI (1, 2, 1). In the examples illustrated in FIGS. 9 and 10, since the gradation value GI (1, 2, 1) is "0", and the gradation value Gg (1, 2, 1) indicated by the image data GD [t3] is "88", the error E (1, 2, 1) is "−88".

Next, in the period t4, the error distribution portion 223 calculates the distribution value EB (1, 0, 0) by multiplying the error E (1, 2, 1) and the distribution rate B (1, 0, 0), and changes the gradation value Gg (2, 2, 1) by subtracting the distribution value EB (1, 0, 0) from the gradation value Gg (2, 2, 1) indicated by the image data GD [t3]. In addition, in the period t4, the error distribution portion 223 calculates the distribution value EB (0, 1, 0) by multiplying the error E (1, 2, 1) and the distribution rate B (0, 1, 0), and changes the gradation value Gg (1, 3, 1) by subtracting the distribution value EB (0, 1, 0) from the gradation value Gg (1, 3, 1) indicated by the image data GD [t3]. In addition, in the period t4, the error distribution portion 223 calculates the distribution value EB (0, 0, 1) by multiplying the error E (1, 2, 1) and the distribution rate B (0, 0, 1), and changes the gradation value Gg (1, 2, 2) by subtracting the distribution value EB (0, 0, 1) from the gradation value Gg (1, 2, 2) indicated by the image data GD [t3]. In the examples illustrated in FIGS. 15 and 16, since the error E (1, 2, 1) is "−88", the gradation value Gg (2, 2, 1) indicated by the image data GD [t3] is "148", the gradation value Gg (1, 3, 1) indicated by the image data GD [t3] is "128", and the gradation value Gg (1, 2, 2) indicated by the image data GD [t3] is "128", the error distribution portion 223 sets the gradation value Gg (2, 2, 1) indicated by the image data GD [t4] to "192" and sets the gradation value Gg (1, 3, 1) indicated by the image data GD [t4] to "156". The gradation value Gg (1, 3, 1) indicated by the image data GD [t4] is set to "145".

Thereafter, the display data generation portion 22 executes error diffusion processing in which the pixel Px (2, 2, 1), the pixel Px (3, 2, 1), the pixel Px (1, 3, 1), and the pixel Px (2, 3, 1), and the pixel Px (3, 3, 1) are set as the target pixel PxT in the period t5 to the period t9.

In the examples illustrated in FIGS. 15 and 16, the pixel Px does not exist in the +X direction of the pixel Px (3, 3, 1) selected as the target pixel PxT in the period t9. In addition, the pixel Px does not exist in the +Y direction of the pixel Px (3, 3, 1) selected as the target pixel PxT in the period t9. On the other hand, the pixel Px exists in the +Z direction of the pixel Px (3, 3, 1) selected as the target pixel PxT in the period t9. Therefore, the pixel selection portion 221 selects the pixel Px (1, 1, 2) as the target pixel PxT in the period t10. The display data generation portion 22 executes error diffusion processing in which the pixel Px (1, 1, 2) is set as the target pixel PxT in the period t10.

Specifically, in the period t10, the arithmetic processing portion 222 first determines whether or not the gradation value Gg (1, 1, 2) indicated by the image data GD [t9] is equal to or greater than the threshold value Th (1, 1, 2). In the examples illustrated in FIGS. 15 and 16, since the gradation value Gg (1, 1, 2) indicated by the image data GD [t9] is "104", and the threshold value Th (1, 1, 2) is "128", "Gg (1, 1, 2)<Th (1, 1, 2)" is established. Therefore, the arithmetic processing portion 222 sets the gradation value GI (1, 1, 2) to the minimum gradation value GI-0, that is, "0".

In the period t10, the error distribution portion 223 calculates the error E (1, 1, 2) by subtracting the gradation value Gg (1, 1, 2) indicated by the image data GD [t9] from the gradation value GI (1, 1, 2). In the examples illustrated in FIGS. 15 and 16, since the gradation value GI (1, 1, 2) is "0", and the gradation value Gg (1, 1, 2) indicated by the image data GD [t9] is "104", the error E (1, 1, 2) is "−104".

Next, in the period t10, the error distribution portion 223 calculates the distribution value EB (1, 0, 0) by multiplying the error E (1, 1, 2) and the distribution rate B (1, 0, 0), and changes the gradation value Gg (2, 1, 2) by subtracting the distribution value EB (1, 0, 0) from the gradation value Gg (2, 1, 2) indicated by the image data GD [t9]. In addition, in the period t10, the error distribution portion 223 calculates the distribution value EB (0, 1, 0) by multiplying the error E (1, 1, 2) and the distribution rate B (0, 1, 0), and changes the gradation value Gg (1, 2, 2) by subtracting the distribution value EB (0, 1, 0) from the gradation value Gg (1, 2, 2) indicated by the image data GD [t9]. In addition, in the period t10, the error distribution portion 223 calculates the distribution value EB (0, 0, 1) by multiplying the error E (1, 1, 2) and the distribution rate B (0, 0, 1), and changes the gradation value Gg (1, 1, 3) by subtracting the distribution value EB (0, 0, 1) from the gradation value Gg (1, 1, 3) indicated by the image data GD [t9]. In the examples illustrated in FIGS. 15 and 16, since the error E (1, 1, 2) is "−104", the gradation value Gg (2, 1, 2) indicated by the image data GD [t9] is "140", the gradation value Gg (1, 2, 2) indicated by the image data GD [t9] is "145", and the gradation value Gg (1, 1, 3) indicated by the image data GD [t9] is "128", the error distribution portion 223 sets the gradation value Gg (2, 1, 2) indicated by the image data GD [t10] to "192", sets the gradation value Gg (1, 2, 2) indicated by the image data GD [t10] to "178", and sets the gradation value Gg (1, 1, 3) indicated by the image data GD [t10] to "148".

Thereafter, the display data generation portion 22 executes error diffusion processing in which the pixels Px (2, 1, 2) to the pixels Px (3, 3, 3) are set as the target pixels PxT in the period t11 to the period t27.

As a result, as illustrated in FIG. 16, in the present embodiment, in the period t27, the display data Img is generated so that the gradation value GI (1, 1, 1), the gradation value GI (3, 1, 1), the gradation value GI (2, 2, 1), the gradation value GI (1, 3, 1), the gradation value GI (3, 3, 1), the gradation value GI (2, 1, 2), the gradation value GI (1, 2, 2), the gradation value GI (3, 2, 2), the gradation value GI (2, 3, 2), the gradation value GI (1, 1, 3), the gradation value GI (3, 1, 3), the gradation value GI (2, 2, 3), the gradation value GI (1, 3, 3), and the gradation value GI (3, 3, 3) are the maximum gradation value GI-1, and the gradation values GI (mx, my, mz) other than these values are the minimum gradation value GI-0. That is, in the present embodiment, as illustrated in FIG. 10, the display data Img can be generated so that the dispersibility of the dot formation pixel Px-1 in which the gradation value GI (mx, my, mz) is the maximum gradation value GI-1 is increased in the plane parallel to the XY plane.

Figure 17:
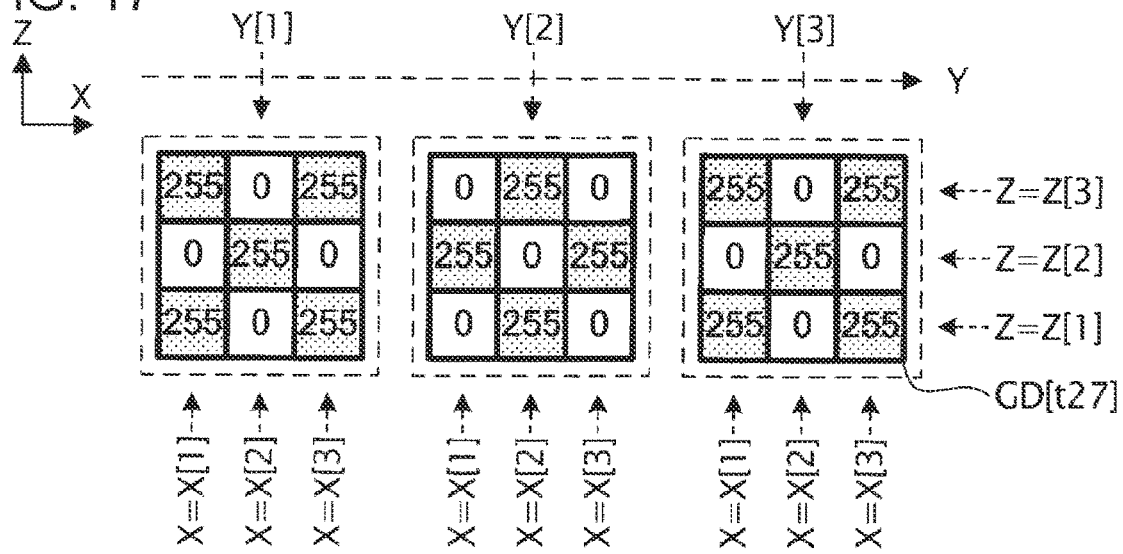
FIG. 17 is an explanatory diagram illustrating an example of display data.
Figure 18:
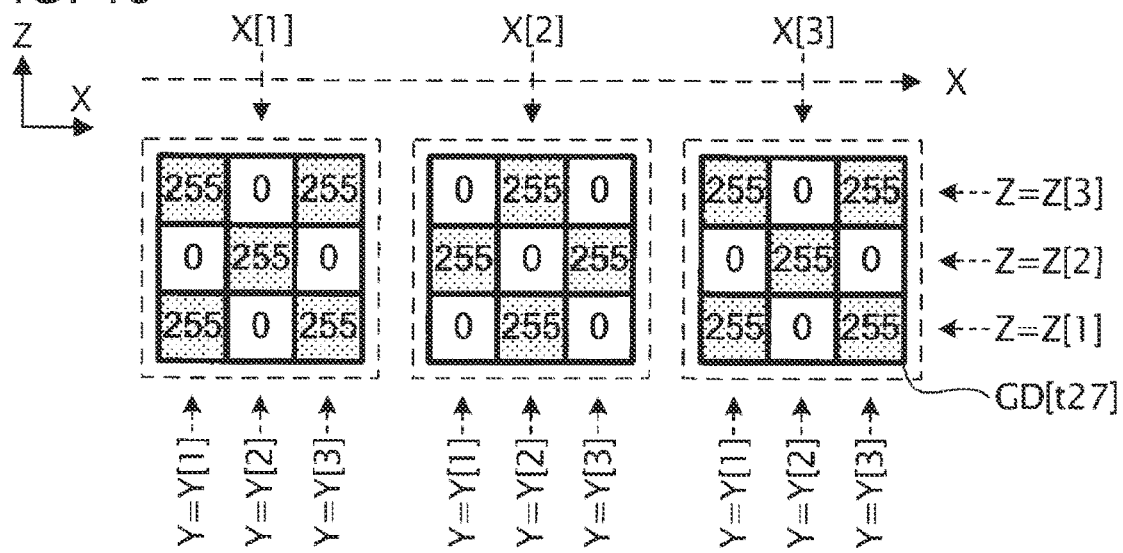
FIG. 18 is an explanatory diagram illustrating an example of display data.

FIGS. 17 and 18 are explanatory diagrams for describing the display data Img according to the present embodiment generated in the period t27. Of these, FIG. 17 is a diagram illustrating the display data Img according to the present embodiment on a plane parallel to the XZ plane, and FIG. 18 is a diagram illustrating the display data Img according to the present embodiment on a plane parallel to the YZ plane.

As illustrated in FIGS. 17 and 18, in the present embodiment, in the error distribution processing, the error E is distributed in the Z axis direction, in addition to the distribution of the error E in the XY plane. Therefore, in the present embodiment, the dispersibility of the dot formation pixel Px-1 can be increased in the plane parallel to the XZ plane and the plane parallel to the YZ plane, in addition to the plane parallel to the XY plane. That is, in the present embodiment, as compared with the reference example, when the image G of the intermediate gradation is formed on the plane parallel to the XZ plane and the plane parallel to the YZ plane among the surface SFs of the object Obj, in addition to the plane parallel to the XY plane, it is possible to improve the image quality of the image G.

6. Effect of Present Embodiment

Figure 19:
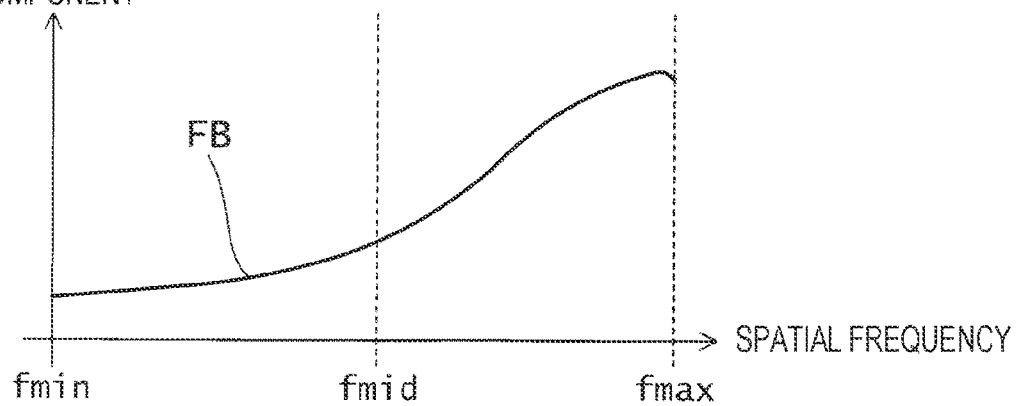
FIG. 19 is an explanatory graph illustrating an example of a curve.

FIG. 19 is an explanatory graph for describing the spatial frequency characteristics of the plurality of dot formation pixels Px-1 corresponding to the maximum gradation value GI-1 of the plurality of gradation values GI (mx, my, mz) indicated by the display data Img generated based on the image data GD when the gradation value Gg (mx, my, mz) indicated by the image data GD is the intermediate gradation value Gg-mid. Specifically, when the gradation value Gg (mx, my, mz) indicated by the image data GD is the intermediate gradation value Gg-mid, and the display data Img is generated based on the image data GD, in a case in which the image formation space SP is cut on a predetermined plane, and the distribution of the plurality of dot formation pixels Px-1 on the predetermined plane is converted from a spatial domain to a spatial frequency domain, FIG. 19 illustrates a curve FB illustrating the relationship between the spatial frequency of the distribution of the plurality of dot formation pixels Px-1 on the predetermined plane and the amount of each frequency component in the distribution of the plurality of dot formation pixels Px-1 on the predetermined plane.

Here, the intermediate gradation value Gg-mid is a gradation value between the gradation value Gg-min and the gradation value Gg-max. More specifically, the intermediate gradation value Gg-mid may be, for example, a gradation value represented by the following equation (7).

$$(1-\gamma 3)\times Gg\text{-min}+\gamma 3\times Gg\text{-max} \leq Gg\text{-mid} \leq (1-\gamma 4)\times Gg\text{-min}+\gamma 4\times Gg\text{-max} \quad \text{Equation (7)}$$

In the equation (7), the value $\gamma 3$ is, for example, a real number satisfying "$0.2 \leq \gamma 3 \leq 0.5$", and the value $\gamma 4$ is, for example, a real number satisfying "$0.5 \leq \gamma 4 \leq 0.7$".

As illustrated in FIG. 19, the curve FB has a characteristic that the frequency component between the maximum frequency fmax, which is the highest frequency, and the intermediate frequency fmid is larger than the frequency component between the minimum frequency fmin, which is the lowest frequency, and the intermediate frequency fmid of the spatial frequency of the distribution of the plurality of dot formation pixels Px-1 on a predetermined plane. Here, the intermediate frequency fmid is an intermediate frequency between the intermediate frequency fmid and the maximum frequency fmax. More specifically, the intermediate frequency fmid may be, for example, a frequency represented by "fmid={fmin+fmax}/2".

In the following, the characteristic that the frequency component between the maximum frequency fmax and the intermediate frequency fmid is larger than the frequency component between the minimum frequency fmin and the intermediate frequency fmid in the spatial frequency domain is referred to as a "predetermined spatial frequency characteristic".

As illustrated in FIG. 19, the curve FB has a peak on the maximum frequency fmax side of the intermediate frequency fmid. Therefore, in the present embodiment, the fact that the curve FB has a peak on the maximum frequency fmax side of the intermediate frequency fmid may be referred to as a "predetermined spatial frequency characteristic".

More specifically, in the present embodiment, the predetermined spatial frequency characteristic is a blue noise characteristic. However, in the present embodiment, the predetermined spatial frequency characteristic is not limited to the blue noise characteristic. In the present embodiment, the predetermined spatial frequency characteristic may be a frequency characteristic in which the frequency component increases on the high frequency side in the spatial frequency domain as compared with the white noise characteristic. For example, in the present embodiment, the predetermined spatial frequency characteristic may be a purple noise characteristic.

In the present embodiment, two planes of a plane PL1 and a plane PL2 can be adopted as a predetermined plane. Specifically, in the present embodiment, when the gradation value Gg (mx, my, mz) indicated by the image data GD is the intermediate gradation value Gg-mid, the display data Img is generated based on the image data GD, the distribution of the plurality of dot formation pixels Px-1 on the plane PL1 that cuts the image formation space SP has a predetermined spatial frequency characteristic, and the distribution of the plurality of dot formation pixels Px-1 on the plane PL2 that cuts the image formation space SP has a predetermined spatial frequency characteristic.

Here, the plane PL1 and the plane PL2 are planes that are not parallel to each other. In other words, the normal vector of the plane PL1 and the normal vector of the plane PL2 intersect each other. For example, the normal vector of the plane PL1 and the normal vector of the plane PL2 may be orthogonal to each other. Specifically, the plane PL1 may be a plane having a normal vector extending in the Z axis direction. More specifically, the plane PL1 may be a plane parallel to the XY plane. In addition, the plane PL2 may be a plane having a normal vector extending in the X axis direction. More specifically, the plane PL2 may be a plane parallel to the YZ plane.

As described above, according to the present embodiment, dots can be disposed on the surface SF of the object Obj so that the distribution of the plurality of dot formation pixels Px-1 on the plane PL1 has a frequency characteristic in which the high frequency component higher than the intermediate frequency fmid is larger than the low frequency component lower than the intermediate frequency fmid in the spatial frequency domain, and the distribution of the plurality of dot formation pixels Px-1 on the plane PL2 which is not parallel to the plane PL1 has a frequency characteristic in which the high frequency component higher than the intermediate frequency fmid is larger than the low frequency component lower than the intermediate frequency fmid in the spatial frequency domain. Therefore, according to the present embodiment, even when the shape of the object Obj has a shape other than the two-dimensional plane, the dispersibility of the arrangement of dots on the surface of the object Obj can be improved.

In addition, in the present embodiment, the error distribution portion 223 distributes the error E in the target pixel PxT not only in the X axis direction and the Y axis direction but also in the Z axis direction. Therefore, according to the present embodiment, among the surface SFs of the object Obj, the dispersibility of the arrangement of dots can be increased on a plane parallel to the XZ plane and a plane parallel to the YZ plane, in addition to the plane parallel to the XY plane.

In addition, in the present embodiment, the target pixel of the error diffusion processing is first shifted in the +X direction, and then when the maximum is reached in the +X direction (there is no other pixel in the +X direction than that pixel), the target pixel is adjacent to one pixel in the +Y direction, is moved to the minimum pixel in the +X direction, and shifted in the +X direction again. Furthermore, when the maximum is reached in the +X direction and the +Y direction (there is no other pixel in the +X direction and no other pixel in the +Y direction than that pixel), the target pixel is adjacent to one pixel in the +Z direction, is moved to the minimum pixel in the +X direction and the +Y direction, and shifted in the +X direction again. That is, the target pixel of the error diffusion processing is shifted in the +X direction, the +Y direction, and the +Z direction, and it can be said that the priority at that time is highest in the +X direction, next highest in the +Y direction, and lowest in the +Z direction.

At this time, the distribution rate B (1, 0, 0) corresponding to the distribution rate in the +X direction is largest, the distribution rate B (0, 1, 0) corresponding to the distribution rate in the +Y direction is next largest, and the distribution rate B (0, 0, 1) corresponding to the distribution rate in the +Z direction is smallest. That is, the higher the priority direction when shifting the target pixel, the larger the distribution rate.

This is for the following reasons. When the error diffusion processing is performed on a certain target pixel Px (mx, my, mz), errors in the three pixels of the pixel Px (mx−1, my, mz), the pixel Px (mx, my−1, mz), and the pixel Px (mx, my, mz−1) at maximum are distributed to the target pixel Px (mx, my, mz) due to the error diffusion processing performed so far. In this case, assuming that the priority is lowered in the order of +X direction, +Y direction, and +Z direction as described above, in the above three pixels, an error diffusion processing is first performed to a pixel Px (mx, my, mz−1), thereafter an error diffusion processing is performed to the pixel Px (mx, my−1, mz), and an error diffusion processing is finally performed to the pixel Px (mx−1, my, mz). Since the error diffusion processing is more accurate as the number of processed pixels increases, the reliability is high in the error diffusion processing for the pixel Px (mx, my−1, mz) than the error diffusion processing for the pixel Px (mx, my, mz−1), and the reliability is high in the error diffusion processing for the pixel Px (mx−1, my, mz) than the error diffusion processing for the pixel Px (mx, my−1, mz). Therefore, as for the errors distributed to the target pixel Px (mx, my, mz), it is preferable that the ratio of the pixel Px (mx−1, my, mz) having the highest reliability is the largest and the ratio of the pixel Px (mx, my, mz−1) having the lowest reliability is the smallest.

In addition, in the present embodiment, the number of times the error E is distributed from another pixel Px to the pixel Px (mx, my+1, mz) may be larger than the number of times the error E is distributed from another pixel Px to the pixel Px (mx+1, my, mz). In the present embodiment, the distribution rate B (1, 0, 0) is determined to be larger than the distribution rate B (0, 1, 0). Therefore, in the present embodiment, as compared with an aspect in which the distribution rate B (1, 0, 0) is equal to or less than the distribution rate B (0, 1, 0), it is possible to improve the uniformity of distribution of the error E to each of the M pixels Px in the image formation space SP.

In addition, in the present embodiment, the number of times the error E is distributed from another pixel Px to the pixel Px (mx, my, mz+1) may be larger than the number of times the error E is distributed from another pixel Px to the pixel Px (mx, my+1, mz). On the other hand, in the present embodiment, the distribution rate B (0, 1, 0) is determined to be larger than the distribution rate B (0, 0, 1). Therefore, in the present embodiment, as compared with an aspect in which the distribution rate B (0, 1, 0) is equal to or less than the distribution rate B (0, 0, 1), it is possible to improve the uniformity of distribution of the error E to each of the M pixels Px in the image formation space SP.

7. Summary of Embodiment

As described above, the terminal apparatus 1 according to the present embodiment includes the image data acquisition portion 21 that acquires the image data GD indicating the gradation value Gg (mx, my, mz) of the image Gf to be displayed by each of the M pixels Px in the image formation space SP when the image Gf is represented in the three-dimensional image formation space SP, and the display data generation portion 22 that generates the display data Img by quantizing the gradation value Gg (nix, my, mz) indicated by the image data GD, in which the display data generation portion 22 includes the pixel selection portion 221 that selects the pixels Px (mx, my, mz) from the M pixels Px, and the error distribution portion 223 that distributes the error E (mx, my, mz) based on the quantization of the gradation value Gg (mx, my, mz) corresponding to the pixel Px (mx, my, mz) to the pixels Px (mx+1, my, mz) located in the +X direction of the pixels Px (mx, my, mz) at a distribution rate B (1, 0, 0), to the pixels Px (mx, my+1, mz) located in the +Y direction of the pixels Px (mx, my, mz) at a distribution rate B (0, 1, 0), and to the pixels Px (mx, my, mz+1) located in the +Z direction of the pixels Px (mx, my, mz) at a distribution rate B (0, 0, 1), the +Y direction is a direction that intersects the +X direction, and the +Z direction is a direction different from the extension direction of the XY plane defined by the +X direction and the +Y direction.

That is, in the present embodiment, the error distribution portion 223 distributes the error E (mx, my, mz) in the +Z direction in addition to the distribution of the error E (mx, my, mz) in the XY plane. Therefore, according to the present embodiment, even when the image G is formed on the surface SF of the object Obj having the three-dimensional shape, it is possible to suppress the occurrence of graininess of dots in the image G.

In the present embodiment, the terminal apparatus 1 is an example of an "image processing apparatus", the image data acquisition portion 21 is an example of an "acquisition portion", the display data generation portion 22 is an example of a "generation portion", the pixel selection portion 221 is an example of a "selection portion", and the error distribution portion 223 is an example of a "distribution portion". The image formation space SP is an example of a "three-dimensional space", the pixel Px (mx, my, Mz) is an example of a "one pixel", the pixel Px (mx+1, my, mz) is an example of a "first pixel", the pixel Px (nix, my+1, mz) is an example of a "second pixel", and the pixel Px (mx, my, mz+1) is an example of a "third pixel". The +X direction is an example of a "first direction", the +Y direction is an example of a "second direction", and the +Z direction is an example of a "third direction". The distribution rate B (1, 0, 0) is an example of a "first distribution rate", the distribution rate B (0, 1, 0) is an example of a "second distribution rate", and the distribution rate B (0, 0, 1) is an example of a "third distribution rate".

In addition, in the terminal apparatus 1 according to the present embodiment, the pixel selection portion 221 may select another pixel Px located in the +X direction of the pixel Px (mx, my, mz) after selecting the pixel Px (mx, my, mz) when any pixel Px of the M pixels Px in the image formation space SP exists in the +X direction of the pixels Px (mx, my, mz).

In addition, in the terminal apparatus 1 according to the present embodiment, the M pixels Px in the image formation space SP may include (My×Mz) pixel rows PxL extending in the +X direction, and the pixel selection portion 221 may select another pixel Px from the pixel row PxL [my+1] [mz] located in the +Y direction of the pixel row PxL [my] [mz] including the pixel Px (mx, my, mz) after selecting the pixel Px (mx, my, mz), when any pixel Px of the M pixels Px in the image formation space SP does not exist in the +X direction of the pixels Px (mx, my, mz).

In the present embodiment, the pixel row PxL [my] [mz] is an example of a "one pixel row", and the pixel row PxL [my+1] [mz] is an example of "another pixel row".

In addition, in the terminal apparatus 1 according to the present embodiment, the M pixels Px in the image formation space SP may include the Mz pixel planes PxP parallel to the XY plane, and the pixel selection portion 221 may select another pixel Px from the pixel plane PxP [mz+1] located in the +Z direction of the pixel plane PxP [mz] including the pixel Px (mx, my, mz) after selecting the pixel Px (mx, my, mz), when any pixel Px of the M pixels Px in the image formation space SP does not exist in the +X direction of the pixels Px (mx, my, mz), and any pixel row PxL of the (My×Mz) pixel rows PxL in the image formation space SP does not exist in the +Y direction of the pixel row PxL [my] [mz] including the pixel Px (mx, my, mz).

That is, in the present embodiment, the pixel selection portion 221 selects the pixel Px from the pixel plane PxP [mz+1] after the selection of the pixel Px on the pixel plane PxP [mz] is completed. Therefore, according to the present embodiment, it is possible to perform the error diffusion processing on M pixels Px in the three-dimensional image formation space SP, and even when the image G is formed on the surface SF of the object Obj having a three-dimensional shape, it is possible to suppress the occurrence of graininess of dots in the image G.

In the present embodiment, the pixel plane PxP [mz] is an example of a "one pixel plane", and the pixel plane PxP [mz+1] is an example of "another pixel plane".

In addition, in the terminal apparatus 1 according to the present embodiment, the distribution rate B (1, 0, 0) may be larger than the distribution rate B (0, 1, 0) and the distribution rate B (0, 0, 1).

Therefore, according to the present embodiment, as compared with the aspect in which the distribution rate B (1, 0, 0) is equal to or less than the distribution rate B (0, 1, 0) or the distribution rate B (0, 0, 1), it is possible to increase the uniformity of distribution of the error E to each of the M pixels Px in the image formation space SP.

In addition, in the terminal apparatus 1 according to the present embodiment, the distribution rate B (0, 1, 0) may be larger than the distribution rate B (0, 0, 1).

Therefore, according to the present embodiment, as compared with the aspect in which the distribution rate B (0, 1, 0) is equal to or less than the distribution rate B (0, 0, 1), it is possible to increase the uniformity of distribution of the error E to each of the M pixels Px in the image formation space SP.

In addition, in the terminal apparatus 1 according to the present embodiment, the pixel Px (mx+1, my, mz) may be the pixel Px adjacent to the pixel Px (mx, my, mz) in the +X direction of the pixel Px (mx, my, mz), the pixel Px (mx, my+1, mz) may be the pixel Px adjacent to the pixel Px (mx, my, mz) in the +Y direction of the pixel Px (mx, my, mz), and the pixel Px (mx, my, Mz+1) may be the pixel Px adjacent to the pixel Px (mx, my, mz) in the +Z direction of the pixel Px (mx, my, mz).

In addition, in the terminal apparatus 1 according to the present embodiment, the +X direction may be a direction orthogonal to the +Y direction and the +Z direction, and the +Y direction may be a direction orthogonal to the +Z direction.

In addition, the recording apparatus 5 according to the present embodiment that forms the image G on the object Obj having a three-dimensional shape includes a head unit 7 that ejects an ink; and the recording control unit 6 that controls ejection of the ink from the head unit 7 so that the image G is formed on the object Obj by the plurality of dots which are formed by the ink ejected from the head unit 7, and of which arrangement is determined by the error diffusion processing using the error diffusion method, in which the recording control unit 6 controls the ejection of the ink from the head unit 7 so that a distribution of the plurality of dots on a plane PL1 has a frequency characteristic that a high frequency component higher than an intermediate frequency fmid is larger than a low frequency component lower than the intermediate frequency fmid in a spatial frequency domain, when the object Obj has the plane PL1, and a distribution of the plurality of dots on a plane PL2 has a frequency characteristic that the high frequency component higher than the intermediate frequency fmid is larger than the low frequency component lower than the intermediate frequency fmid in the spatial frequency domain, when the object Obj has the plane PL2 that is not parallel to the plane PL1.

Therefore, according to the present embodiment, even when the shape of the object Obj has a shape other than the two-dimensional plane, the dispersibility of the arrangement of dots on the surface of the object Obj can be improved.

In the present embodiment, the object Obj is an example of an "object", the ink is an example of a "liquid", the recording control unit 6 is an example of a "control portion", the plane PL1 is an example of a "first plane", the plane PL2 is an example of a "second plane", and the intermediate frequency fmid is an example of a "predetermined frequency".

In addition, in the recording apparatus 5 according to the present embodiment, the distribution of the plurality of dots on the plane PL1 may have a frequency characteristic different from a white noise characteristic in the spatial frequency domain, and the distribution of the plurality of dots on the plane PL2 may have a frequency characteristic different from the white noise characteristic in the spatial frequency domain.

In addition, in the recording apparatus 5 according to the present embodiment, the distribution of the plurality of dots on the plane PL1 may have a blue noise characteristic in the spatial frequency domain, and the distribution of the plurality of dots on the plane PL2 may have the blue noise characteristic in the spatial frequency domain.

B. MODIFICATION EXAMPLE

Each of the above illustrated embodiments can be modified in various manners. A specific aspect of modification is illustrated below. Two or more aspects randomly selected from the following examples can be appropriately merged to the extent that these aspects do not contradict each other.

Modification Example 1

In the above-described embodiment, the error distribution portion 223 uses the error diffusion data GK illustrated in FIG. 7 in the error diffusion processing, and the present disclosure is not limited to such an aspect. In the error diffusion processing, the error distribution portion 223 may use error diffusion data that enables distribution of the error E in the Z axis direction, in addition to the distribution of the error E in the XY plane. For example, in the error diffusion processing, the error distribution portion 223 may use the error diffusion data GK-A illustrated in FIG. 20, the error diffusion data GK-B illustrated in FIG. 21, the error diffusion data GK-C illustrated in FIG. 22, the error diffusion data GK-D illustrated in FIG. 23, or the error diffusion data GK-E illustrated in FIG. 24.

Figure 20:
FIG. 20 is an explanatory table illustrating an example of error diffusion data according to Modification Example 1.

FIG. 20 is an explanatory table for describing the error diffusion data GK-A.

As illustrated in FIG. 20, when the pixel Px (mx, my, mz) is the target pixel PxT, the error diffusion data GK-A is data in which the pixel Px (mx+1, my, mz), the pixel Px (mx, my+1, Mz), the pixel Px (mx, my, mz+1), the pixel Px (mx+2, my, mz), the pixel Px (mx, my+2, mz), and the pixel Px (mx, my, mz+2) are designated as the peripheral pixels PxS.

In addition, the error diffusion data GK-A is data that determines each distribution rate B so that the distribution rate B (1, 0, 0) is larger than the distribution rate B (0, 1, 0), the distribution rate B (0, 1, 0) is larger than the distribution rate B (1, 1, 0), the distribution rate B (2, 0, 0) is larger than the distribution rate B (0, 2, 0), and the distribution rate B (0, 2, 0) is larger than the distribution rate B (0, 0, 2).

Figure 21:
FIG. 21 is an explanatory table illustrating an example of error diffusion data according to Modification Example 1.

FIG. 21 is an explanatory table for describing the error diffusion data GK-B.

As illustrated in FIG. 21, when the pixel Px (mx, my, mz) is the target pixel PxT, the error diffusion data GK-B is data in which the pixel Px (mx+1, my, mz), the pixel Px (mx, my+1, Mz), the pixel Px (mx, my, mz+1), the pixel Px (mx+2, my, mz), the pixel Px (mx, my+2, mz), the pixel Px (mx, my, mz+2), the pixel Px (mx+1, my+1, mz), the pixel Px (mx, my+1, mz+1), and the pixel Px (mx+1, my, mz+1) are designated as the peripheral pixels PxS.

In addition, the error diffusion data GK-B is data that determines each distribution rate B so that the distribution rate B (1, 0, 0) is larger than the distribution rate B (0, 1, 0), the distribution rate B (0, 1, 0) is larger than the distribution rate B (1, 1, 0), the distribution rate B (2, 0, 0) is larger than the distribution rate B (0, 2, 0), the distribution rate B (0, 2, 0) is larger than the distribution rate B (1, 2, 0), the distribution rate B (1, 1, 0) is larger than the distribution rate B (1, 0, 1), and the distribution rate B (1, 0, 1) is larger than the distribution rate B (0, 1, 1).

FIG. 22 is an explanatory table for describing the error diffusion data GK-C.

As illustrated in FIG. 22, when the pixel Px (mx, my, mz) is the target pixel PxT, the error diffusion data GK-C is data in which the pixel Px (mx+1, my, mz), the pixel Px (mx+1, my, mz+1), the pixel Px (mx-1, my+1, mz), the pixel Px (mx-1, my+1, mz+1), the pixel Px (mx, my, mz+1), the pixel Px (mx, my+1, mz), the pixel Px (mx, my+1, mz+1), the pixel Px (mx+1, my+1, mz), and the pixel Px (mx+1, my+1, mz+1) are designated as the peripheral pixels PxS.

In addition, the error diffusion data GK-C is data that determines each distribution rate B so that the distribution rate B (1, 0, 0) is larger than the distribution rate B (0, 1, 0), the distribution rate B (0, 1, 0) is larger than the distribution rate B (0, 0, 1), the distribution rate B (0, 0, 1) is larger than the distribution rate B (1, 1, 0), the distribution rate B (1, 1, 0) is larger than the distribution rate B (0, 1, 1), the distribution rate B (0, 1, 1) is larger than the distribution rate B (1, 0, 1), the distribution rate B (-1, 1, 0), and the distribution rate B (1, 1, 1), and the distribution rate B (1, 0, 1), the distribution rate B (-1, 1, 0), and the distribution rate B (1, 1, 1) is larger than the distribution rate B (-1, 1, 1).

FIG. 23 is an explanatory table for describing the error diffusion data GK-D.

As illustrated in FIG. 23, when the pixel Px (mx, my, mz) is the target pixel PxT, the error diffusion data GK-D is data in which the pixel Px (mx, my, mz+1) and the pixel Px (mx, my, mz+2), the pixel Px (mx+1, my, mz), the pixel Px (mx+1, my, mz+1), the pixel Px (mx+2, my, mz), the pixel Px (mx-1, my+1, mz), the pixel Px (mx-1, my+1, mz+1), the pixel Px (mx, my+1, mz), the pixel Px (mx, my+1, mz+1), the pixel Px (mx+1, my+1, mz), the pixel Px (mx+1, my+1, mz+1), and the pixel Px (mx, my+2, mz) are designated as the peripheral pixels PxS.

In addition, the error diffusion data GK-D is data that determines each distribution rate B so that the distribution rate B (1, 0, 0) is larger than the distribution rate B (0, 1, 0), the distribution rate B (0, 1, 0) is larger than the distribution rate B (0, 0, 1), the distribution rate B (0, 0, 1) is larger than the distribution rate B (2, 0, 0), the distribution rate B (2, 0, 0) is larger than the distribution rate B (0, 2, 0), the distribution rate B (0, 2, 0) is larger than the distribution rate B (0, 0, 2), the distribution rate B (0, 0, 2) is larger than the distribution rate B (1, 0, 1), the distribution rate B (0, 1, 1), and the distribution rate B (1, 1, 0), and the distribution rate B (1, 0, 1), the distribution rate B (0, 1, 1), and the distribution rate B (1, 1, 0) are larger than the distribution rate B (-1, 1, 0), the distribution rate B (-1, 1, 1), and the distribution rate B (1, 1, 1).

Figure 24:
FIG. 24 is an explanatory table illustrating an example of error diffusion data according to Modification Example 1.

FIG. 24 is an explanatory table for describing the error diffusion data GK-E.

As illustrated in FIG. 24, when the pixel Px (mx, my, mz) is the target pixel PxT, the error diffusion data GK-E is data in which the pixel Px (mx+1, my, mz), the pixel Px (mx+1, my+1, mz), the pixel Px (mx, my+1, mz), the pixel Px (mx-1, my+1, mz), the pixel Px (mx-1, my-1, mz+1), the pixel Px (mx, my-1, mz+1), the pixel Px (mx+1, my-1, mz+1), the pixel Px (mx-1, my, mz+1), the pixel Px (mx, my, mz+1), the pixel Px (mx+1, my, mz+1), the pixel Px (mx-1, my+1, mz+1), the pixel Px (mx, my+1, mz+1), and the pixel Px (mx+1, my+1, mz+1) are designated as the peripheral pixels PxS.

In addition, the error diffusion data GK-E is data that determines each distribution rate B so that the distribution rate B (1, 0, 0) is larger than the distribution rate B (0, 1, 0), the distribution rate B (0, 1, 0) is larger than the distribution rate B (0, 0, 1), the distribution rate B (0, 0, 1) is larger than the distribution rate B (1, 1, 0), the distribution rate B (1, 1, 0) is larger than the distribution rate B (-1, 1, 0), the distribution rate B (-1, 1, 0) is larger than the distribution rate B (-1, 0, 1) and the distribution rate B (1, 0, 1) the distribution rate B (-1, 0, 1) and the distribution rate B (1, 0, 1) are larger than the distribution rate B (0, -1, 1), and the distribution rate B (0, 1, 1), and the distribution rate B (0, -1, 1) and the distribution rate B (0, 1, 1) are larger than the distribution rate B (-1, -1, 1), the distribution rate B (1, -1, 1), the distribution rate B (-1, 1, 1), and the distribution rate B (1, 1, 1).

As described above, according to the present modification example, in the error diffusion processing, the error diffusion data GK-A, the error diffusion data GK-B, the error diffusion data GK-C, the error diffusion data GK-D, or the error diffusion data GK-E is used. All of the error diffusion data GK-A, the error diffusion data GK-B, the error diffusion data GK-C, the error diffusion data GK-D, and the error diffusion data GK-E are error diffusion data for distributing the error E in the Z axis direction, in addition to the distribution of the error E in the XY plane in the error diffusion processing. Therefore, according to the present modification example, among the surface SFs of the object Obj, the dispersibility of the arrangement of dots can be increased on a plane parallel to the XZ plane and a plane parallel to the YZ plane, in addition to the plane parallel to the XY plane.

As described above, in the terminal apparatus 1 according to the present modification example, the error distribution portion 223 distributes the error E (mx, my, mz) based on the quantization of the gradation value Gg (mx, my, mz) corresponding to the pixel Px (mx, my, mz) to the pixel Px (mx+2, my, mz) located in the +X direction of the pixel Px (mx+1, my, mz) at the distribution rate B (2, 0, 0), to the pixel Px (mx, my+2, mz) located in the +Y direction of the pixel Px (mx, my+1, mz) at the distribution rate B (0, 2, 0), and to the pixel Px (mx, my, mz+2) located in the +Z direction of the pixel Px (mx, my, mz+1) at the distribution rate B (0, 0, 2).

Therefore, according to the present modification example, even when the image G is formed on the surface SF of the object Obj having the three-dimensional shape, it is possible to suppress the occurrence of graininess of dots in the image G.

In the present modification example, the pixel Px (mx+2, my, mz) is an example of a "fourth pixel", the pixel Px (mx, my+2, mz) is an example of a "fifth pixel", and the pixel Px (mx, my, mz+2) is an example of a "sixth pixel". The distribution rate B (2, 0, 0) is an example of a "fourth distribution rate", the distribution rate B (0, 2, 0) is an example of a "fifth distribution rate", and the distribution rate B (0, 0, 2) is an example of a "sixth distribution rate".

In addition, in the terminal apparatus 1 according to the present modification example, the distribution rate B (2, 0, 0) may be larger than the distribution rate B (0, 2, 0) and the distribution rate B (0, 0, 2), and the distribution rate B (0, 2, 0) may be larger than the distribution rate B (0, 0, 2).

Therefore, according to the present modification example, as compared with the aspect in which the distribution rate B (2, 0, 0) is equal to or less than the distribution rate B (0, 2, 0) or the distribution rate B (0, 0, 2), it is possible to increase the uniformity of distribution of the error E to each of the M pixels Px in the image formation space SP. In addition, according to the present modification example, as compared with the aspect in which the distribution rate B (0, 2, 0) is equal to or less than the distribution rate B (0, 0, 2), it is possible to increase the uniformity of distribution of the error E to each of the M pixels Px in the image formation space SP.

In addition, in the terminal apparatus 1 according to the present modification example, the error distribution portion 223 may distribute the error E (mx, my, mz) based on the quantization of the gradation value Gg (mx, my, mz) corresponding to the pixel Px (mx, my, mz) to the pixel Px (mx+1, my+1, mz) located in the +Y direction of the pixel Px (mx+1, my, mz) at the distribution rate B (1, 1, 0), to the pixel Px (mx+1, my, mz+1) located in the +Z direction of the pixel Px (mx+1, my, mz) at the distribution rate B (1, 0, 1), and to the pixel Px (mx, my+1, mz+1) located in the +Z direction of the pixel Px (mx, my+1, mz) at the distribution rate B (0, 1, 1).

Therefore, according to the present modification example, even when the image G is formed on the surface SF of the object Obj having the three-dimensional shape, it is possible to suppress the occurrence of graininess of dots in the image G.

In the present modification example, the pixel Px (mx+1, my+1, mz) is an example of a "seventh pixel", the pixel Px (mx+1, my, mz+1) is an example of an "eighth pixel", and the pixel Px (mx, my+1, mz+1) is an example of a "ninth pixel". The distribution rate B (1, 1, 0) is an example of a "seventh distribution rate", and the distribution rate B (1, 0, 1) is an example of an "eighth distribution rate", and the distribution rate B (0, 1, 1) is an example of a "ninth distribution rate".

In addition, in the terminal apparatus 1 according to the present modification example, the distribution rate B (1, 1, 0) may be larger than the distribution rate B (1, 0, 1) and the distribution rate B (0, 1, 1), and the distribution rate B (1, 0, 1) may be larger than the distribution rate B (0, 1, 1).

Modification Example 2

In the above-described embodiment and Modification Example 1, in the error distribution processing, the error distribution portion 223 distributes the error E (mx, my, mz) corresponding to the pixel Px (mx, my, mz) which is the target pixel PxT to the gradation value Gg (mx+dx, my+dy, mz+dz) corresponding to the pixel Px (mx+dx, my+dy, mz+dz) which is the peripheral pixel PxS, and the present disclosure is not limited to such an aspect. In the error distribution processing, the error distribution portion 223 may distribute the error E (mx, my, mz) corresponding to the pixel Px (mx, my, mz) which is the target pixel PxT to the threshold value Th (mx+dx, my+dy, mz+dz) corresponding to the pixel Px (mx+dx, my+dy, mz+dz) which is the peripheral pixel PxS.

Figure 25:
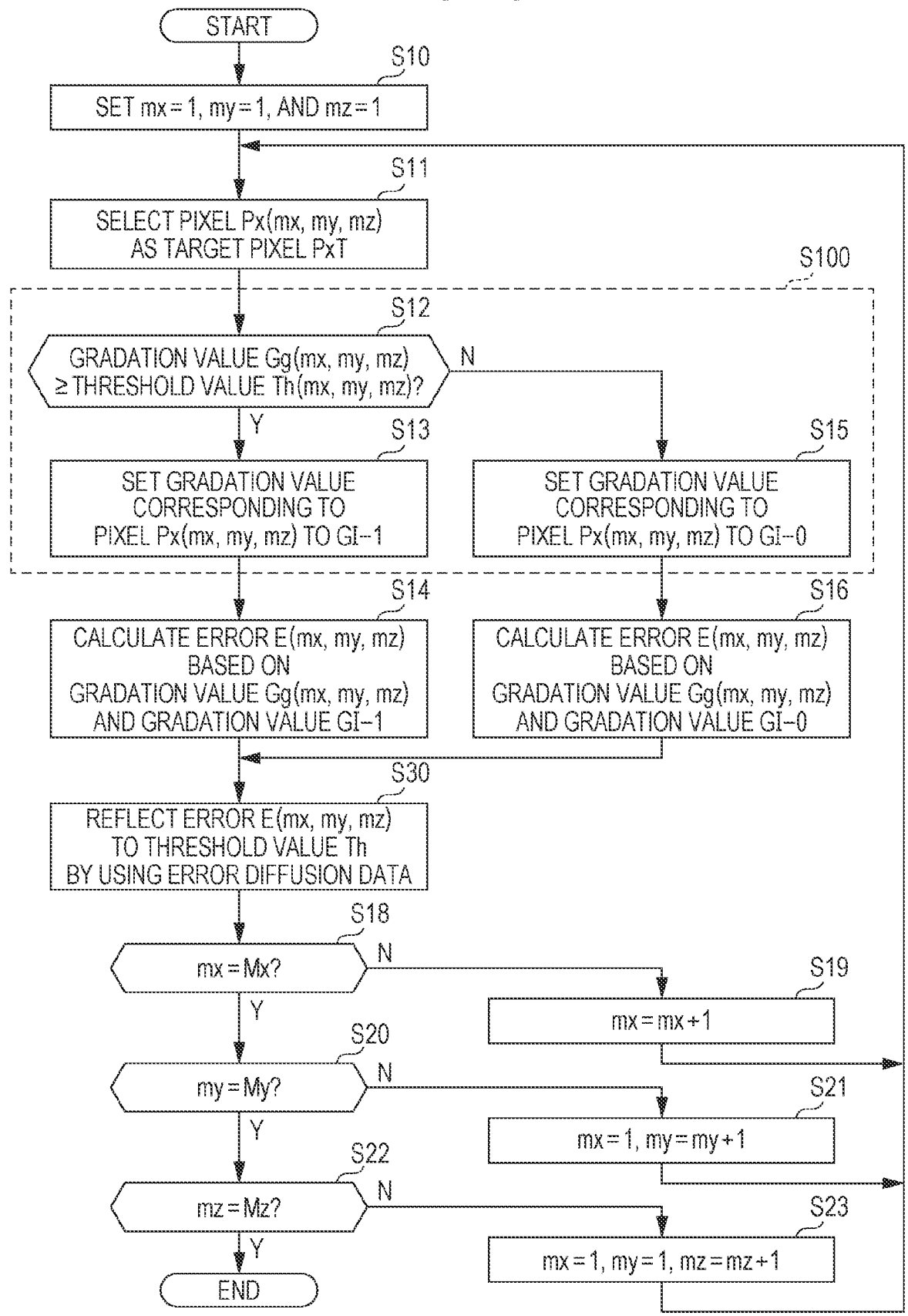
FIG. 25 is a flowchart illustrating an example of display data generation processing according to Modification Example 2.

FIG. 25 is a flowchart illustrating an example of the operation of the recording system Sys when the recording system Sys according to the present modification example executes the display data generation processing. The flowchart illustrated in FIG. 25 is the same as the flowchart illustrated in FIG. 6 except that the processing of Step S30 described later is executed instead of the processing of Step S17 as the error distribution processing.

As illustrated in FIG. 25, the display data generation portion 22 included in the recording system Sys according to the present modification example executes the processing of Steps S10 to S16 described above in the display data generation processing.

Thereafter, the error distribution portion 223 according to the present modification example distributes the error E (mx, my, mz) to one or a plurality of threshold values Th corresponding to one or a plurality of peripheral pixels PxS located around the target pixel PxT by using the error diffusion data GK as the error distribution processing (S30). Specifically, in the error distribution processing in Step S30, when the pixel Px (mx+dx, my+dy, mz+dz) which is the peripheral pixel PxS exists, the error distribution portion 223 according to the present modification example changes the threshold value Th (mx+dx, my+dy, mz+dz) corresponding to the pixel Px (mx+dx, my+dy, mz+dz) based on the following equation (8).

$$Th(mx+dx,my+dy,mz+dz)=Th(mx+dx,my+dy,mz+dz)+EB(dx,dy,dz) \qquad \text{Equation (8)}$$

That is, in the error distribution processing in Step S30, the error distribution portion 223 according to the present modification example changes the threshold value Th (mx+dx, my+dy, mz+dz) by adding the distribution value EB (dx, dy, dz), which is a value obtained by multiplying the error E (mx, my, mz) and the distribution rate B (dx, dy, dz), to the threshold value Th (mx+dx, my+dy, mz+dz).

Thereafter, the display data generation portion 22 according to the present modification example executes the processing of Steps S18 to S23 described above.

As described above, according to the present modification example, in the error distribution processing, the error E is distributed in the Z axis direction, in addition to the distribution of the error E in the XY plane. Therefore, according to the present modification example, among the surface SFs of the object Obj, the dispersibility of the arrangement of dots can be increased on a plane parallel to the XZ plane and a plane parallel to the YZ plane, in addition to the plane parallel to the XY plane.

Modification Example 3

In the above-described embodiment and the Modification Examples 1 and 2, in the error diffusion processing, an example is illustrated in which the gradation value GI (mx, my, mz) set by the arithmetic processing portion 222 is two values, the maximum gradation value GI-1 and the minimum gradation value GI-0, and the present disclosure is not limited to such an aspect. In the error diffusion processing, the gradation value GI (mx, my, mz) set by the arithmetic processing portion 222 may be three or more values.

Figure 26:
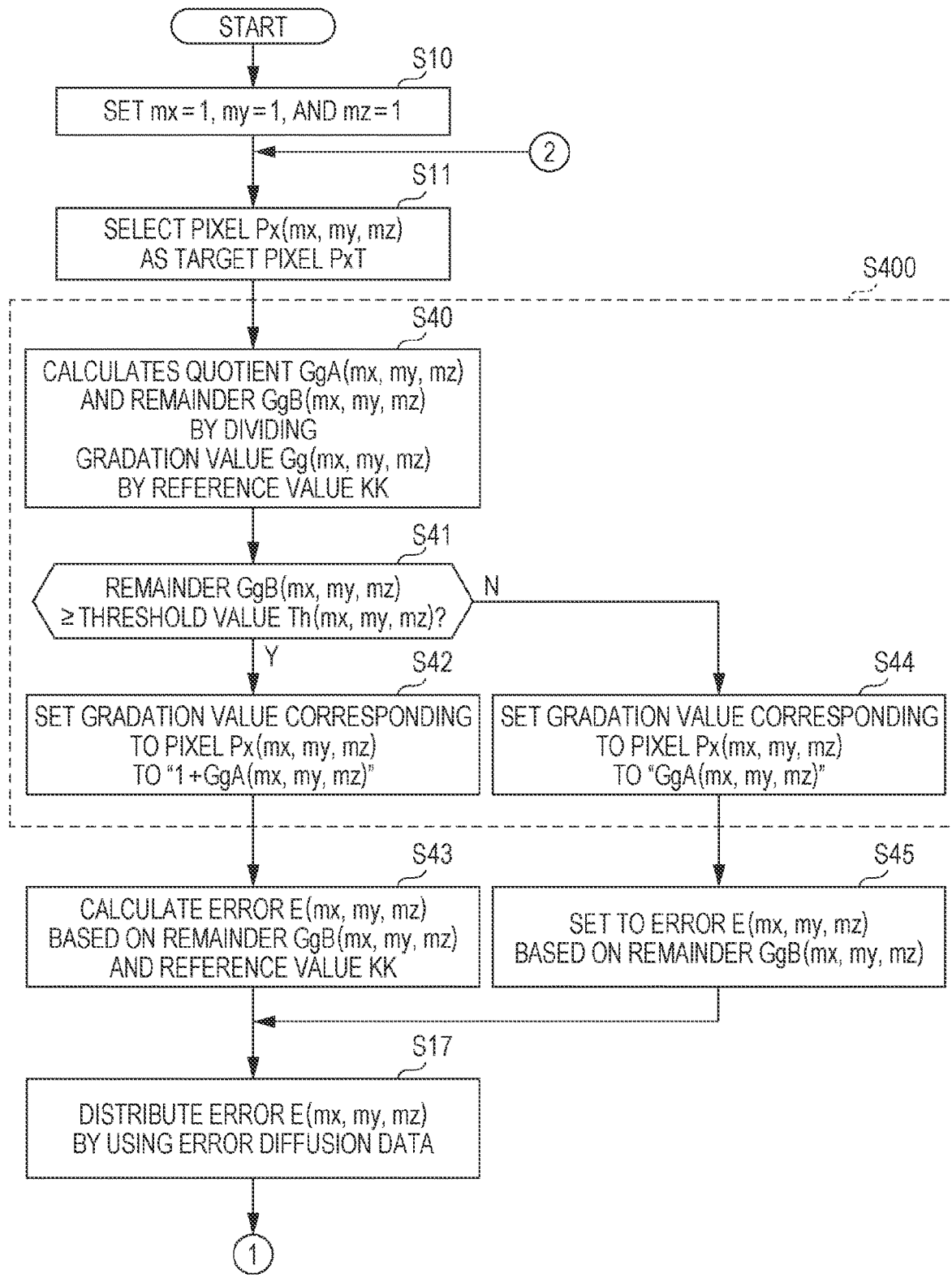
FIG. 26 is a flowchart illustrating an example of display data generation processing according to Modification Example 3.
Figure 27:
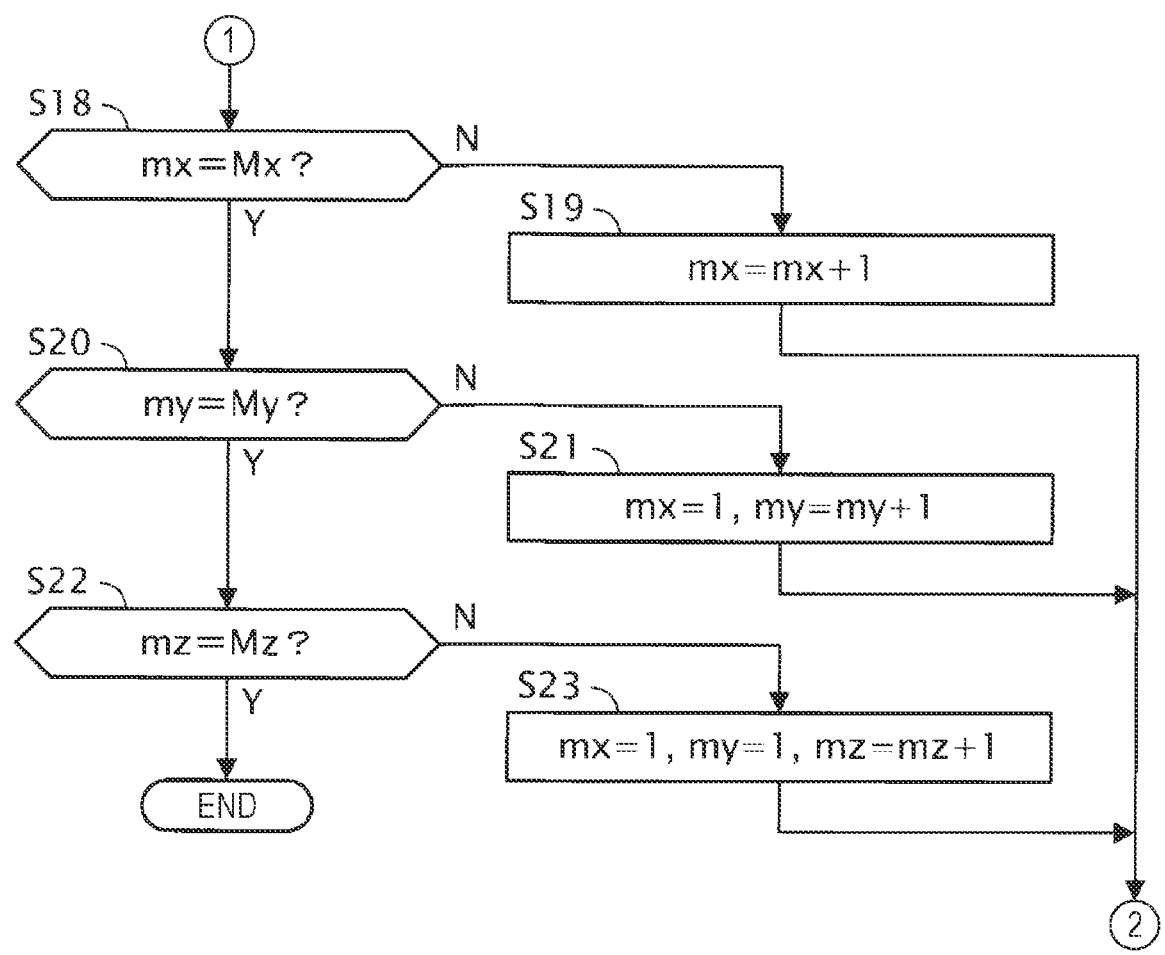
FIG. 27 is a flowchart illustrating an example of display data generation processing according to Modification Example 3.

FIGS. 26 and 27 are flowcharts illustrating an example of the operation of the recording system Sys when the recording system Sys according to the present modification example executes the display data generation processing. The flowcharts illustrated in FIGS. 26 and 27 are the same as the flowchart illustrated in FIG. 6 except that the processing of Step S400 including Steps S40, S41, S42, and S44 is executed instead of the processing of Step S100, the processing of Step S43 is executed instead of the processing of Step S14, and the processing of Step S45 is executed instead of the processing of Step S16 as the error diffusion processing for one pixel.

As illustrated in FIG. 26, the display data generation portion 22 according to the present modification example executes the processing of Steps S10 to S11 described above in the display data generation processing.

Thereafter, the arithmetic processing portion 222 according to the present modification example calculates the quotient GgA (mx, my, mz) and the remainder GgB (nix, my, mz) by dividing the gradation value of the image Gf in the target pixel PxT indicated by the image data GD, that is, the gradation value Gg (mx, my, mz) by the reference value KK (S40). In the present modification example, the reference value KK is an integer satisfying the following equation (9).

$$0 < KK \leq \{Gg\text{-max} - Gg\text{-min}\}/2 \quad \text{Equation (9)}$$

In the present modification example, as an example, it is assumed that the gradation value Gg-min is "0" and the gradation value Gg-max is "256". In the present modification example, as an example, it is assumed that the reference value KK is "64".

Thereafter, the arithmetic processing portion 222 according to the present modification example determines whether or not the remainder GgB (mx, my, mz) is equal to or greater than the threshold value Th (mx, my, mz) (S41). In the present modification example, it is assumed that the threshold value Th (mx, my, mz) is a value satisfying the following equation (10).

$$\gamma5 \times KK \leq Th(mx,my,mz) \leq \gamma6 \times KK \quad \text{Equation (10)}$$

Here, the value $\gamma5$ is, for example, a real number satisfying "$0.3 \leq \gamma5 \leq 0.5$", and the value $\gamma6$ is, for example, a real number satisfying "$0.5 \leq \gamma6 \leq 0.7$". More specifically, in the present embodiment, as an example, it is assumed that the threshold value Th (mx, my, mz) is "32".

However, the threshold value Th (mx, my, mz) may be an integer satisfying the following equation (11) when the value obtained by subtracting the gradation value Gg-min from the gradation value Gg-max is not an integral multiple of the reference value KK.

$$(1-\gamma7) \times \{KK \times GgA(mx,my,mz)\} + \gamma7 \times \{KK \times (1+GgA(mx,my,mz))\} Th(mx,my,mz) \leq (1-\gamma8) \times \{KK \times GgA(mx,my,mz)\} + \gamma8 \times \{KK \times (1+GgA(mx,my,mz))\} \quad \text{Equation (11)}$$

Here, the value $\gamma7$ is, for example, a real number satisfying "$0.3 \leq \gamma7 \leq 0.5$", and the value $\gamma8$ is, for example, a real number satisfying "$0.5 \leq \gamma8 \leq 0.7$".

When the result of the determination in Step S41 is affirmative, the arithmetic processing portion 222 according to the present modification example sets the gradation value GI (mx, my, mz) corresponding to the pixel Px (mx, my, mz), which is the target pixel PxT, to "1+GgA (mx, my, mz)" (S42).

Thereafter, the error distribution portion 223 according to the present modification example calculates the error E (mx, my, mz) based on the remainder GgB (mx, my, mz) and the reference value KK (S43). Specifically, the error distribution portion 223 calculates the error E (mx, my, mz) in Step S43 based on the following equation (12).

$$E(mx,my,mz) = KK - GgB(mx,my,mz) \quad \text{Equation (12)}$$

On the other hand, when the result of the determination in Step S41 is negative, the arithmetic processing portion 222 according to the present modification example sets the gradation value GI (mx, my, mz) corresponding to the pixel Px (mx, my, mz), which is the target pixel PxT, to "GgA (mx, my, mz)" (S44).

Thereafter, the error distribution portion 223 according to the present modification example sets the value obtained by multiplying the remainder GgB (mx, my, mz) by "−1" as the error E (mx, my, mz) (S45).

The display data generation portion 22 according to the present modification example executes the processing of Steps S17 to S23 described above.

As described above, according to the present modification example, since the gradation value GI (mx, my, mz) is three or more values, as compared with the case where the gradation value GI (mx, my, mz) is two values, the image G formed on the surface SF of the object Obj can be made into an image closer to the image Gf.

Modification Example 4

In the above-described embodiments and Modification Examples 1 to 3, the image Gf indicated by the image data GD and the image G indicated by the display data Tmg may include a plurality of colors.

In the present modification example, it is assumed that the image Gf indicated by the image data GD and the image G indicated by the display data Img are represented by four colors of cyan, magenta, yellow, and black.

In the present modification example, it is assumed that the image data GD includes the image data GD-Cy indicating the gradation value of cyan to be displayed by each of the M pixels Px included in the image formation space SP in order to form the image Gf on the surface SF of the object Obj, the image data GD-Mg indicating the gradation value of magenta to be displayed by each of the M pixels Px included in the image formation space SP in order to form the image Gf on the surface SF of the object Obj, the image data GD-Y1 indicating the gradation value of yellow to be displayed by each of the M pixels Px included in the image formation space SP in order to form the image Gf on the surface SF of the object Obj, and the image data GD-Bk indicating the gradation value of black to be displayed by each of the M pixels Px included in the image formation space SP in order to form the image Gf on the surface SF of the object Obj.

In addition, in the present modification example, it is assumed that the display data Img includes the display data Img-Cy indicating the gradation value of cyan to be displayed by each of the M pixels Px included in the image formation space SP in order to form the image G on the surface SF of the object Obj, the display data Img-Mg indicating the gradation value of magenta to be displayed by each of the M pixels Px included in the image formation space SP in order to form the image G on the surface SF of the object Obj, the display data Img-Y1 indicating the gradation value of yellow to be displayed by each of the M pixels Px included in the image formation space SP in order to form the image G on the surface SF of the object Obj, and the display data Img-Bk indicating the gradation value of black to be displayed by each of the M pixels Px included in the image formation space SP in order to form the image G on the surface SF of the object Obj.

In addition, in the present modification example, the storage unit 3 provided in the recording system Sys according to the present modification example stores error diffusion data GK-Cy for executing the error diffusion processing on the image data GD-Cy, error diffusion data GK-Mg for executing the error diffusion processing on the image data GD-Mg, error diffusion data GK-Y1 for executing the error diffusion processing on the image data GD-Y1, and error diffusion data GK-Bk for executing the error diffusion processing on the image data GD-Bk. Here, the error diffusion data GK-Cy, the error diffusion data GK-Mg, the error diffusion data GK-Y1, and the error diffusion data GK-Bk may be the same data as any one of the error diffusion data GK, the error diffusion data GK-A, the error diffusion data GK-B, the error diffusion data GK-C, and the error diffusion data GK-D. In addition, the error diffusion data GK-Cy, the error diffusion data GK-Mg, the error diffusion data GK-Y1, and the error diffusion data GK-Bk may be data indicating a distribution rates B equal to each other or data indicating distribution rates B different from each other.

In addition, in the present modification example, the arithmetic processing portion 222 according to the present modification example executes the error diffusion processing on the image data GD-Cy, the error diffusion processing on the image data GD-Mg, the error diffusion processing on the image data GD-Y1, and the error diffusion processing on the image data GD-Bk. In addition, the error distribution portion 223 according to the present modification example executes the error diffusion processing on the image data GD-Cy using the error diffusion data GK-Cy, the error diffusion processing on the image data GD-Mg using the error diffusion data GK-Mg, the error diffusion processing on the image data GD-Y1 using the error diffusion data GK-Y1, and the error diffusion processing on the image data GD-Bk using the error diffusion data GK-Bk. As a result, the display data generation portion 22 according to the present modification example generates the display data Img-Cy based on the image data GD-Cy, the display data Img-Mg based on the image data GD-Mg, the display data Img-Y1 based on the image data GD-Y1, and the display data Img-Bk based on the image data GD-Bk.

As described above, according to the present modification example, since a plurality of error diffusion data are provided so as to correspond one-to-one with the plurality of colors of the image Gf indicated by the image data GD and the image G indicated by the display data Img, when the image Gf indicated by the image data GD and the image G indicated by the display data Img are color images, it is possible to suppress the occurrence of graininess in the image G.

As described above, in the terminal apparatus 1 according to the present modification example, the image data GD includes the image data GD-Cy indicating the gradation value of cyan to be displayed by each of the M pixels Px in the image formation space SP when the cyan image is represented in the image formation space SP, and the image data GD-Mg indicating the gradation value of magenta to be displayed by each of the M pixels Px in the image formation space SP when the magenta image is represented in the image formation space SP. The display data generation portion 22 generates the display data Img-Cy by quantizing the gradation value of cyan indicated by the image data GD-Cy, and the display data Img-Mg by quantizing the gradation value of magenta indicated by the image data GD-Mg. The error distribution portion 223 distributes the error E based on the quantization of the gradation value of cyan corresponding to the pixel Px (mx, my, mz) to the pixel Px (mx+1, my, mz) located in the +X direction of the pixel Px (mx, my, mz) at the distribution rate B (1, 0, 0), to the pixel Px (mx, my+1, mz) located in the +Y direction of the pixel Px (mx, my, mz) at the distribution rate B (0, 1, 0), and to the pixel Px (mx, my, mz+1) located in the +Z direction of the pixel Px (mx, my, mz) at the distribution rate B (0, 0, 1), and distributes the error E based on the quantization of the gradation value of magenta corresponding to the pixel Px (mx, my, mz) to the pixel Px (mx+1, my, mz) located in the +X direction of the pixel Px (mx, my, mz) at the distribution rate B (1, 0, 0), to the pixel Px (mx, my+1, mz) located in the +Y direction of the pixel Px (mx, my, mz) at the distribution rate B (0, 1, 0), and to the pixel Px (mx, my, mz+1) located in the +Z direction of the pixel Px (mx, my, mz) at the distribution rate B (0, 0, 1).

Therefore, according to the present modification example, when the color image G is printed on the surface SF of the object Obj having the three-dimensional shape, it is possible to suppress the occurrence of graininess in the image G.

In the present modification example, cyan is an example of a "first color", magenta is an example of a "second color", cyan image is an example of a "first image", magenta image is an example of a "second image", the cyan gradation value is an example of a "first gradation value", and the magenta gradation value is an example of a "second gradation value". The image data GD-Cy is an example of a "first image data", the image data GD-Mg is an example of a "second image data", the display data Img-Cy is an example of a "first display data", and the display data Img-Mg is an example of a "second display data".

Modification Example 5

In the above-described embodiments and Modification Examples 1 to 4, the values Mx, the value My, and the value Mz may be values that satisfy the following equation (13), or values that satisfy the following equation (14). In the following equations (13) and (14), a is a natural number of 2 or more.

$$Mx=My=Mz=\alpha^2 \qquad \text{Equation (13)}$$

$$Mx=My=Mz=2^\alpha \qquad \text{Equation (14)}$$

Modification Example 6

In the above-described embodiments and Modification Examples 1 to 5, the terminal control unit 2 and the storage unit 3 may be mounted on the recording apparatus 5.

In addition, in the above-described embodiments and Modification Examples 1 to 5, the terminal apparatus 1 may include the recording control unit 6, the head unit 7, the ink supply unit 8, and the robot hand 9.

Modification Example 7

In the above-described embodiments and Modification Examples 1 to 6, the robot hand 9 changes the position and posture of the head unit 7 in the image formation space SP, and the present disclosure is not limited to such an aspect. The robot hand 9 may be capable of changing the position and posture of the object Obj in the image formation space SP. In this case, the position and posture of the head unit 7 may be fixed in the image formation space SP.

Modification Example 8

In the above-described embodiments and Modification Examples 1 to 7, when it is determined that the pixel selection portion 221 satisfies "mx=Mx" in Step S18 and the pixel selection portion 221 does not satisfy "my=My" in Step S20, the value mx is set to "1" and "1" is added to the value my in Step S21, and the present disclosure is not limited to such an aspect. In Step S21, the pixel selection portion 221 may set the value mx as "Mx" and add "1" to the value my. That is, the pixel to be subjected to the error diffusion processing next to the pixel Px (Mx, my, mz) may be the pixel Px (Mx, my+1, mz) instead of the pixel Px (1, my+1, mz).

However, in this case, in Step S18 of the error diffusion processing for the pixel Px (Mx, my+1, mz), in the above-described embodiments and Modification Examples 1 to 7, the fact that it is determined whether or not "mx=Mx" is satisfied is changed so as to determine whether or not "mx=1" is satisfied. Furthermore, in Step S19 of the error diffusion processing for the pixel Px (Mx, my+1, mz), in the above-described embodiments and Modification Examples 1 to 7, the fact that "1" is added to the value mx is changed to add "−1" to the value mx. In the error diffusion processing for the pixel Px (1, my+1, mz), the conditions of Step S18, Step S19, and Step S21 are restored. That is, the pixel that executes the error diffusion processing next to the pixel Px (1, my+1, mz) is the pixel Px (1, my+2, mz), and then the pixel Px (2, my+2, mz). Thereafter, the conditions of Step S18, Step S19, and Step S21 are alternately switched in the same manner.

According to the error diffusion processing, when sequentially executing the error diffusion processing on the pixel row extending in the X axis direction including the pixels Px (Mx, my, mz), the target pixels to be subjected to the error diffusion processing are sequentially shifted in the +X direction. On the other hand, when sequentially executing the error diffusion processing on the pixel row extending in the X axis direction including the pixel Px (Mx, my+1, mz), the target pixels to be subjected to the error diffusion processing are sequentially shifted in the −X direction. Thereafter, the shift in the +X direction and the shift in the −X direction are alternately repeated.

In addition, in the above, the conditions of Step S18, Step S19, and Step S21 are alternately switched when "mx=Mx" or "mx=1" is satisfied in Step S18, and similarly, the conditions of Step S18, Step S19, and Step S23 may be switched. That is, when it is determined that the pixel selection portion 221 satisfies "mx=Mx" in Step S18, the pixel selection portion 221 satisfies "my=My" in Step S20, and the pixel selection portion 221 does not satisfy "mz=Mz" in Step S22, the value mx may be set to the value as it is (that is, either "Mx" or "1"), the value my may be set to the value as it is (that is, either "My" or "1"), and "1" may be added to the value mz in step S23. At this time as well, the conditions of Step S18 and Step S19 are switched in the same manner as described above. That is, when the condition of Step S18 at that time is whether or not "mx=Mx" is satisfied, it is switched to whether or not "mx=1" is satisfied, and on the contrary, when the condition is whether or not "mx=1" is satisfied, it is switched to whether or not "mx=Mx" is satisfied. Similarly, when the condition of Step S19 at that time is to add "1" to the value mx, it is switched to add "−1" to the value mx, and on the contrary, when the condition is to add "−1" to the value mx, it is switched to add "1" to the value mx.

When switching the conditions in Step S19, it is preferable to reverse the positive and negative values of the value dx among the error diffusion data of FIGS. 7 to 8, 20 to 23, and 27. For example, in the error diffusion data, it is preferable to switch to dx=−1 when dx=1, switch to dx=2 when dx=−2, and leave it as it is when dx=0.

What is claimed is:

1. An image processing apparatus comprising a processor that is configured to perform:
   an acquisition function that acquires image data indicating a gradation value of an image to be displayed by each of a plurality of pixels in a three-dimensional space when the image is represented in the three-dimensional space; and
   a generation function that generates display data by quantizing the gradation value indicated by the image data, wherein
   the generation function including
      a selection function that selects one pixel from the plurality of pixels, and
      an error distribution function that distributes an error based on quantization of a gradation value corresponding to the one pixel
         to a first pixel located in a first direction of the one pixel at a first distribution rate,
         to a second pixel located in a second direction of the one pixel at a second distribution rate, and
         to a third pixel located in a third direction of the one pixel at a third distribution rate,
      the second direction being a direction that intersects the first direction, and
      the third direction being a direction different from an extension direction of a plane defined by the first direction and the second direction, and wherein
   when any pixel of the plurality of pixels in the three-dimensional space exists in the first direction of one pixel, the selection function selects another pixel located in the first direction of the one pixel after selecting the one pixel, and wherein
   the first distribution rate is larger than the second distribution rate and the third distribution rate.

2. The image processing apparatus according to claim 1, wherein
   the plurality of pixels in the three-dimensional space includes a plurality of pixel rows extending in the first direction, and
   when any pixel of the plurality of pixels in the three-dimensional space does not exist in the first direction of the one pixel, the selection function selects another pixel from another pixel row located in the second direction of one pixel row including the one pixel after selecting the one pixel.

3. The image processing apparatus according to claim 2, wherein the plurality of pixels in the three-dimensional space includes a plurality of pixel planes parallel to a plane defined by the first direction and the second direction, and when 1) any pixel of the plurality of pixels in the three-dimensional space does not exist in the first direction of the one pixel, and 2) any pixel row of the plurality of pixel rows in the three-dimensional space does not exist in the second direction of the one pixel row including the one pixel, the selection function selects another pixel from another pixel plane located in the third direction of one pixel plane including the one pixel after selecting the one pixel.

4. The image processing apparatus according to claim 2, wherein the second distribution rate is larger than the third distribution rate.

5. The image processing apparatus according to claim 1, wherein the first pixel is a pixel adjacent to the one pixel in the first direction of the one pixel, the second pixel is a pixel adjacent to the one pixel in the second direction of the one pixel, and the third pixel is a pixel adjacent to the one pixel in the third direction of the one pixel.

6. The image processing apparatus according to claim 5, wherein the error distribution function distributes the error based on the quantization of the gradation value corresponding to the one pixel to a fourth pixel adjacent to the first pixel in the first direction of the first pixel at a fourth distribution rate, to a fifth pixel adjacent to the second pixel in the second direction of the second pixel at a fifth distribution rate, and to a sixth pixel adjacent to the third pixel in the third direction of the third pixel at a sixth distribution rate.

7. The image processing apparatus according to claim 6, wherein the fourth distribution rate is larger than the fifth distribution rate and the sixth distribution rate, and the fifth distribution rate is larger than the sixth distribution rate.

8. The image processing apparatus according to claim 5, wherein the error distribution function distributes the error based on the quantization of the gradation value corresponding to the one pixel to a seventh pixel adjacent to the first pixel in the second direction of the first pixel at a seventh distribution rate, to an eighth pixel adjacent to the first pixel in the third direction of the first pixel at an eighth distribution rate, and to a ninth pixel adjacent to the second pixel in the third direction of the second pixel at a ninth distribution rate.

9. The image processing apparatus according to claim 8, wherein the seventh distribution rate is larger than the eighth distribution rate and the ninth distribution rate, and the eighth distribution rate is larger than the ninth distribution rate.

10. The image processing apparatus according to claim 1, wherein the first pixel is located at the same position as the one pixel in the second direction and the third direction, the second pixel is located at the same position as the one pixel in the first direction and the third direction, and the third pixel is located at the same position as the one pixel in the first direction and the second direction.

11. The image processing apparatus according to claim 1, wherein the first direction is a direction orthogonal to the second direction and the third direction, and the second direction is a direction orthogonal to the third direction.

12. The image processing apparatus according to claim 1, further comprising:

a head unit that is configured to eject a liquid based on the display data by ejecting the liquid at each corresponding pixel having the quantized gradation value of one value, and not ejecting the liquid at each corresponding pixel having the quantized gradient value of a value other than the one value.

13. The image processing apparatus according to claim 1, wherein the generation function supplies the display data to a recording apparatus including a head unit that ejects a liquid based on the display data by ejecting the liquid at each corresponding having the quantized gradation value of one value, and not ejecting the liquid at each corresponding pixel having the quantized gradient value of a value other than the one value.

14. The image processing apparatus according to claim 1, wherein the image data includes first image data indicating a first gradation value, which is a gradation value of a first image to be displayed by each of the plurality of pixels in the three-dimensional space when representing the first image of a first color in the three-dimensional space, and second image data indicating a second gradation value, which is a gradation value of a second image to be displayed by each of the plurality of pixels in the three-dimensional space when representing the second image of a second color in the three-dimensional space, the generation function generates first display data by quantizing the first gradation value indicated by the first image data, and second display data by quantizing the second gradation value indicated by the second image data, and the error distribution function distributes an error based on the quantization of the first gradation value corresponding to the one pixel to the first pixel located in the first direction of the one pixel at the first distribution rate, to the second pixel located in the second direction of the one pixel at the second distribution rate, and to the third pixel located in the third direction of the one pixel at the third distribution rate, and the error distribution function distributes an error based on the quantization of the second gradation value corresponding to the one pixel to the first pixel at a tenth distribution rate, to the second pixel at an eleventh distribution rate, and to the third pixel at a twelfth distribution rate.

15. An image processing method comprising:

an acquisition step of acquiring image data indicating a gradation value of an image to be displayed by each of a plurality of pixels in a three-dimensional space when the image is represented in the three-dimensional space; and a generation step of generating display data by quantizing the gradation value indicated by the image data, wherein the generation step includes
- a selection step of selecting one pixel from the plurality of pixels, and
- an error distribution step of distributing an error based on quantization of a gradation value corresponding to the one pixel
  - to a first pixel located in a first direction of the one pixel at a first distribution rate,
  - to a second pixel located in a second direction of the one pixel at a second distribution rate, and
  - to a third pixel located in a third direction of the one pixel at a third distribution rate,
- the second direction being a direction that intersects the first direction, and
- the third direction being a direction different from an extension direction of a plane defined by the first direction and the second direction, and wherein when any pixel of the plurality of pixels in the three-dimensional space exists in the first direction of one pixel, the selection function selects another pixel located in the first direction of the one pixel after selecting the one pixel, and wherein the first distribution rate is larger than the second distribution rate and the third distribution rate.

16. A non-transitory computer-readable storage medium storing a program, the program causing a computer to perform an acquisition function that acquires image data indicating a gradation value of an image to be displayed by each of a plurality of pixels in a three-dimensional space when the image is represented in the three-dimensional space; and a generation function that generates display data by quantizing the gradation value indicated by the image data, wherein the generation function includes
- a selection function that selects one pixel from the plurality of pixels, and
- an error distribution function that distributes an error based on quantization of a gradation value corresponding to the one pixel,
  - to a first pixel located in a first direction of the one pixel at a first distribution rate,
  - to a second pixel located in a second direction of the one pixel at a second distribution rate, and
  - to a third pixel located in a third direction of the one pixel at a third distribution rate,
- the second direction being a direction that intersects the first direction, and
- the third direction being a direction different from an extension direction of a plane defined by the first direction and the second direction, and wherein when any pixel of the plurality of pixels in the three-dimensional space exists in the first direction of one pixel, the selection function selects another pixel located in the first direction of the one pixel after selecting the one pixel, and wherein the first distribution rate is larger than the second distribution rate and the third distribution rate.

* * * * *